INVENTOR.
RICHARD KOBLER
BY George H. Fritzinger
AGENT

INVENTOR.
RICHARD KOBLER
BY George H. Fritzinger
AGENT

INVENTOR.
RICHARD KOBLER

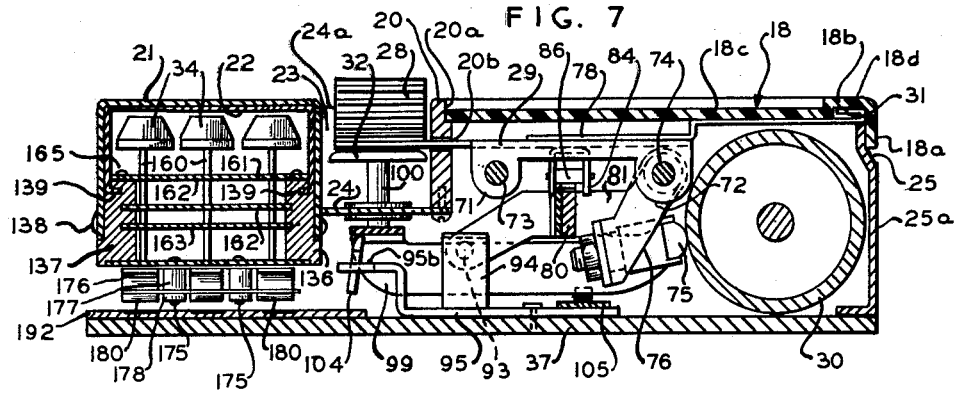

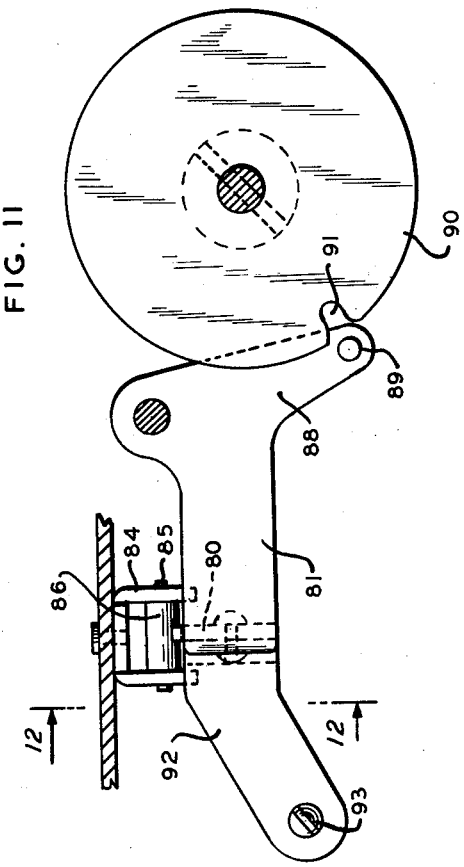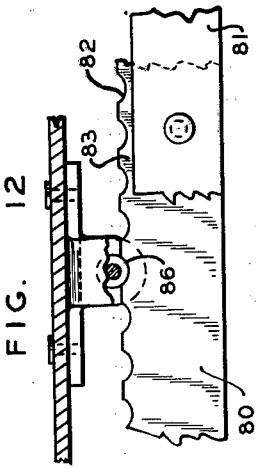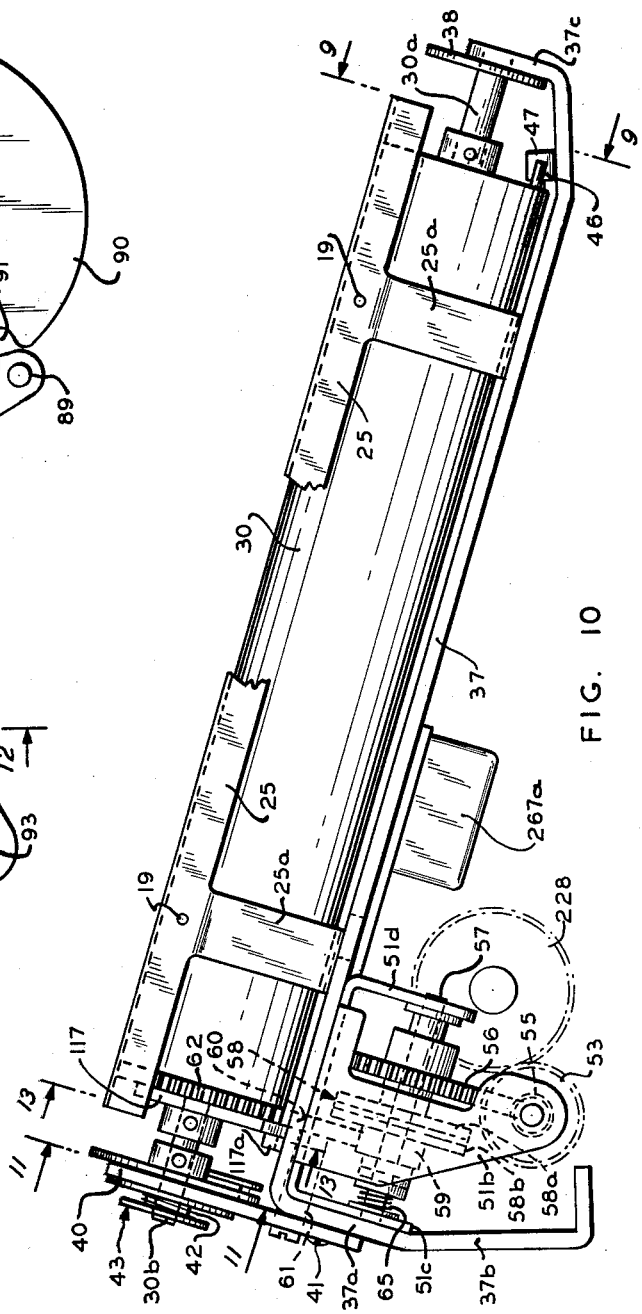

Nov. 10, 1964 R. KOBLER 3,156,782
AUTOMATIC REPERTORY TELEPHONE DIALING MACHINE
Filed Dec. 16, 1960 12 Sheets-Sheet 7
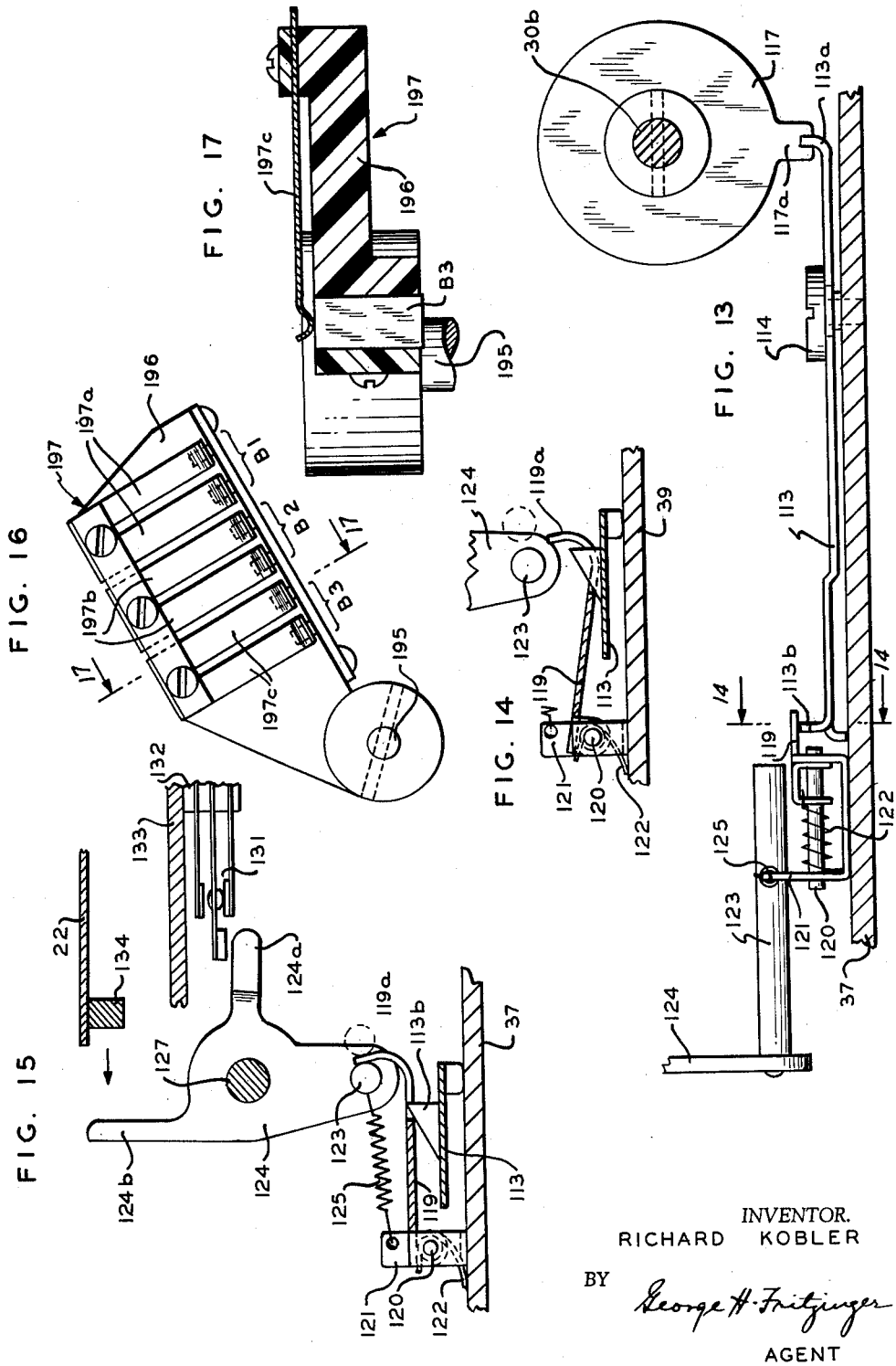
INVENTOR.
RICHARD KOBLER
BY George H. Fritzinger
AGENT Nov. 10, 1964  R. KOBLER  3,156,782
AUTOMATIC REPERTORY TELEPHONE DIALING MACHINE
Filed Dec. 16, 1960  12 Sheets-Sheet 8

INVENTOR.
RICHARD KOBLER
BY George H. Fritzinger
AGENT

Nov. 10, 1964    R. KOBLER    3,156,782
AUTOMATIC REPERTORY TELEPHONE DIALING MACHINE
Filed Dec. 16, 1960    12 Sheets-Sheet 9
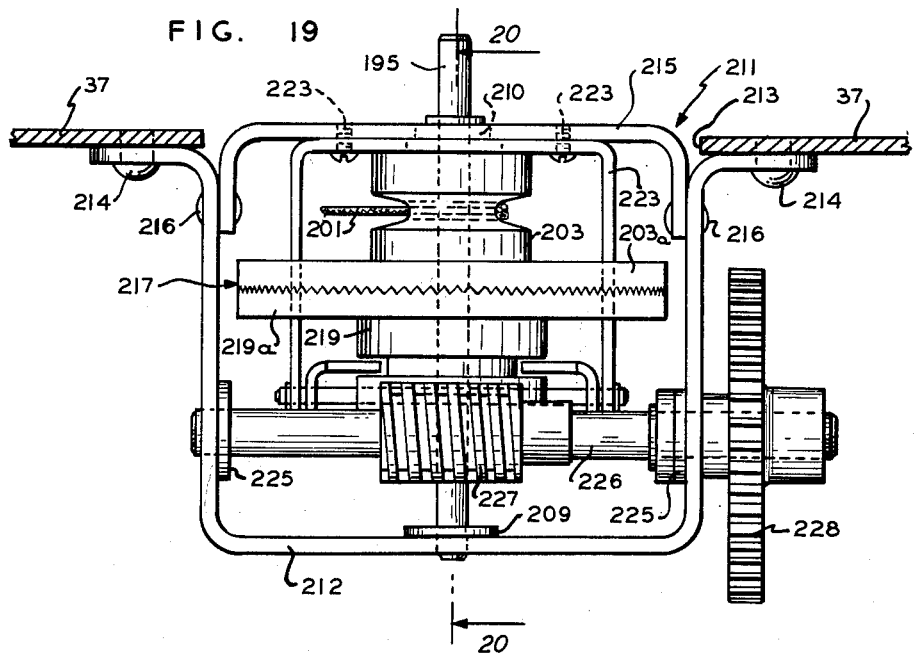
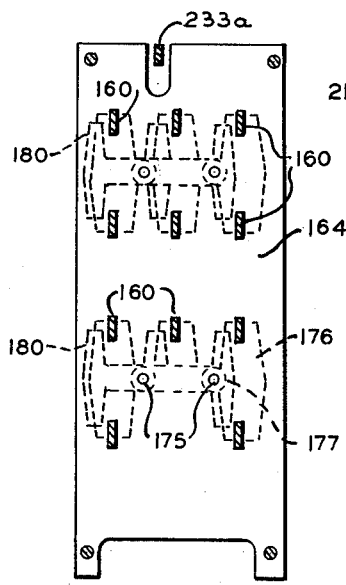
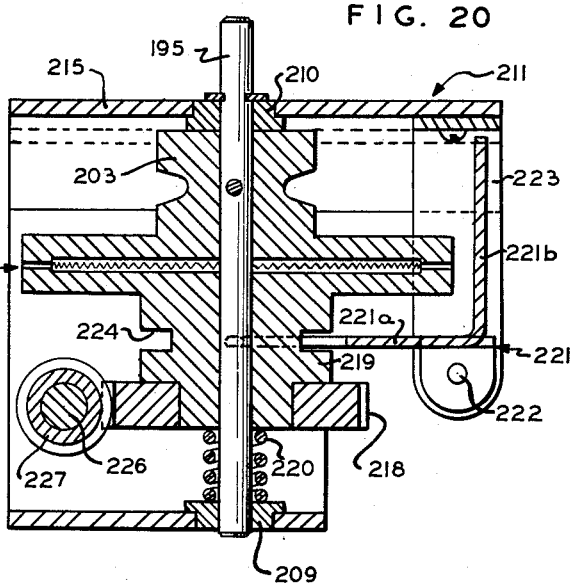
INVENTOR.
RICHARD KOBLER
BY George H. Fritzinger
AGENT Nov. 10, 1964  R. KOBLER  3,156,782
AUTOMATIC REPERTORY TELEPHONE DIALING MACHINE
Filed Dec. 16, 1960  12 Sheets-Sheet 10
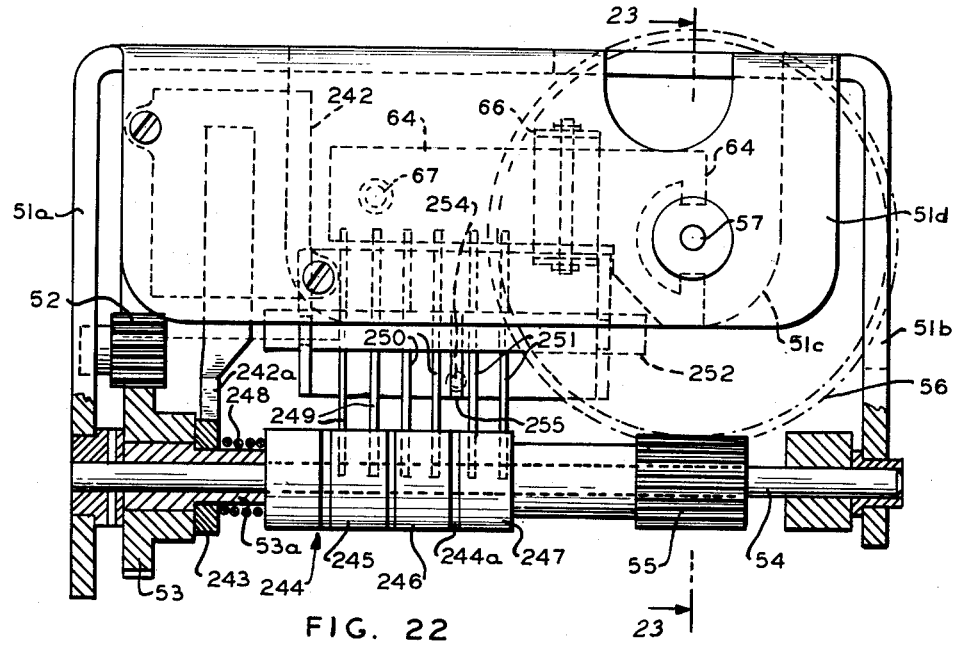
FIG. 22
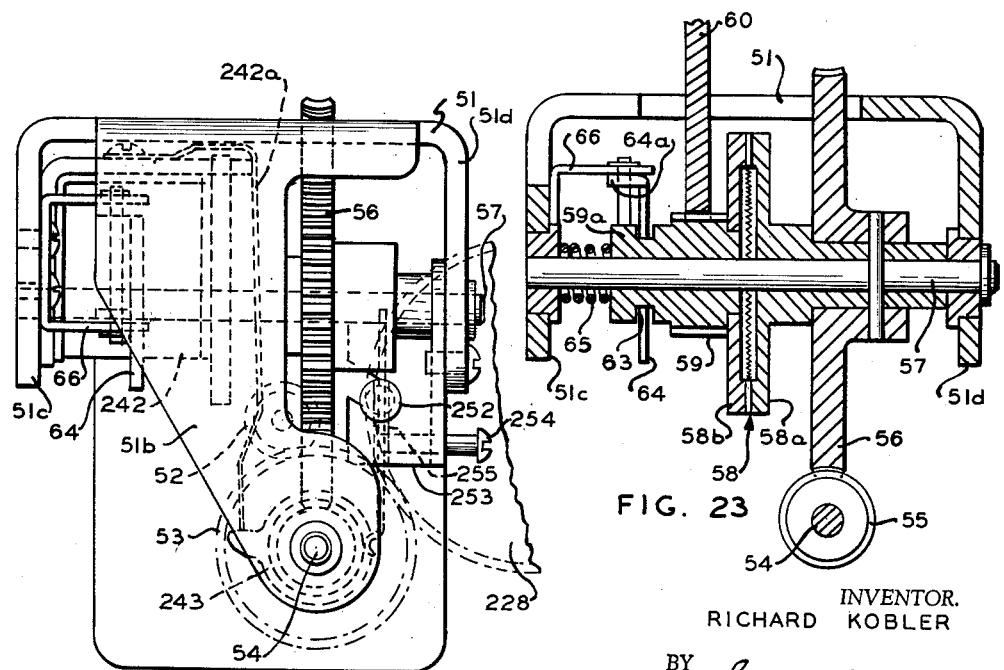
FIG. 24
FIG. 23
INVENTOR.
RICHARD KOBLER
BY George H. Fritzinger
AGENT Nov. 10, 1964  R. KOBLER  3,156,782
AUTOMATIC REPERTORY TELEPHONE DIALING MACHINE
Filed Dec. 16, 1960  12 Sheets-Sheet 11

INVENTOR.
RICHARD KOBLER
BY George H. Fritzinger
AGENT

Nov. 10, 1964  R. KOBLER  3,156,782
AUTOMATIC REPERTORY TELEPHONE DIALING MACHINE
Filed Dec. 16, 1960  12 Sheets-Sheet 12

ADVANCE CLUTCH SOL.

TELEPHONE

INVENTOR.
RICHARD KOBLER
BY George H. Fritzinger
AGENT

United States Patent Office 3,156,782
Patented Nov. 10, 1964

3,156,782
AUTOMATIC REPERTORY TELEPHONE
DIALING MACHINE
Richard Kobler, West Orange, N.J., assignor to
McGraw-Edison Company, Elgin, Ill., a corporation of Delaware
Filed Dec. 16, 1960, Ser. No. 76,318
25 Claims. (Cl. 179—90)

This invention relates to repertory telephone dialing machines which are capable of recording subscribers telephone numbers on a magnetic record medium in code form and of selectively reproducing the numbers to complete telephone switching connections with selected telephone subscribers.

The invention relates in many respects to improvements in the automatic telephone repertory dialing systems described and claimed in the Kobler application Serial No. 657,378, filed May 6, 1957, and since abandoned; continuation application, Serial No. 278,516, filed May 1, 1963, now Patent No. 3,104,288; divisional application 214,888, filed August 6, 1962 now Patent No. 3,104,287; Kobler et al. application Serial No. 784,258, filed December 31, 1958, now Patent No. 3,040,133, and the Kobler application Serial No. 829,881, filed July 27, 1959, now Patent No. 3,104,285.

An object of the present invention is to provide an improved mechanical design of automatic repertory dialing machine which is small, compact and easy to operate.

Another object is to provide such improved dialing machine which is provided fully with safeguarding features to render it foolproof against misoperation.

Another object is to provide such improved dialing machine which is capable of recording and playing back subscribers' telephone numbers to feed error-free dialing pulses into a telephone line with a precision within the most rigid specifications of the telephone companies.

Another object is to provide such dialing machine with a manual dialing mechanism of the pushbutton type adapted to save space and to speed up the telephone-number recording process.

Features of the invention reside in providing the dialing machine with a subscriber's list sheet readily removable to permit subscribers' names whose numbers are recorded in the machine to be typed or written thereon and to be erased readily therefrom when recorded numbers in the machine are changed, which has all manual controls readily accessible from the top of the machine but inset from the contour of the housing to prevent accidental operation thereof, which permits easy selection of subscribers' numbers to be dialed by shifting a scan knob selector along one side of the list sheet, which has a dial bar positioned below and extending along the path of the scan knob to enable a playback operation to be started by a simple natural manipulation of a finger of the hand the instant the scan knob is shifted to a selected subscriber's name, and which has a series of interlocks between the pushbutton dial keys to prevent any inadvertent or accidental misoperation of the dial keys during the recording of telephone numbers.

These and other objects and features of the invention will be apparent from the following description and the appended claims.

In the description of the invention reference is had to the accompanying drawings, of which:

FIGURE 4 is a vertical sectional view taken on the line 4—4 of FIGURE 3;

FIGURE 6 is a vertical sectional view as seen from the line 6—6 in FIGURE 2;

FIGURE 7 is a vertical sectional view taken centrally through the machine on the line 7—7 of FIGURE 2;

FIGURE 8 is a rear elevational view of the mechanism of the machine as seen from line 8—8 of FIGURE 2;

FIGURE 9 is an end view of the record drum as seen from the line 9—9 of FIGURE 10;

FIGURE 10 is a left-hand elevational view of the mechanism of the machine shown in FIGURE 3;

FIGURE 11 is a view of the interlock between the scan detent bar and the record drum taken on the line 11—11 of FIGURE 10;

FIGURE 12 is a sectional view taken on the line 12—12 of FIGURE 11;

FIGURE 13 is a view of the record-switch latch mechanism taken on the line 13—13 of FIGURE 10;

FIGURE 14 is a view of the latch mechanism in the unoperate position which it occupies when the record drum is in home position, taken substantially on the line 14—14 of FIGURE 13;

FIGURE 15 is a view of the latch mechanism of FIGURE 14 showing the mechanism in operated position;

FIGURE 16 is a plan view of the advance clutch timer arm;

FIGURE 17 is a section taken on the line 17—17 of FIGURE 16;

FIGURE 19 is a rear view of the advance clutch mechanism as seen from the line 19—19 of the bottom view of the machine shown in FIGURE 18;

FIGURE 20 is a sectional view on the line 20—20 of FIGURE 19;

FIGURE 21 is a sectional view of the dial key set taken on the line 21—21 of FIGURE 2;

FIGURE 22 is a rear view of the wash-out commutator mechanism taken on the line 22—22, FIGURE 18;

FIGURE 23 is a section taken on the line 23—23 of FIGURE 22;

FIGURE 24 is a righthand view of the mechanism shown in FIGURE 22; and

Figure 1:
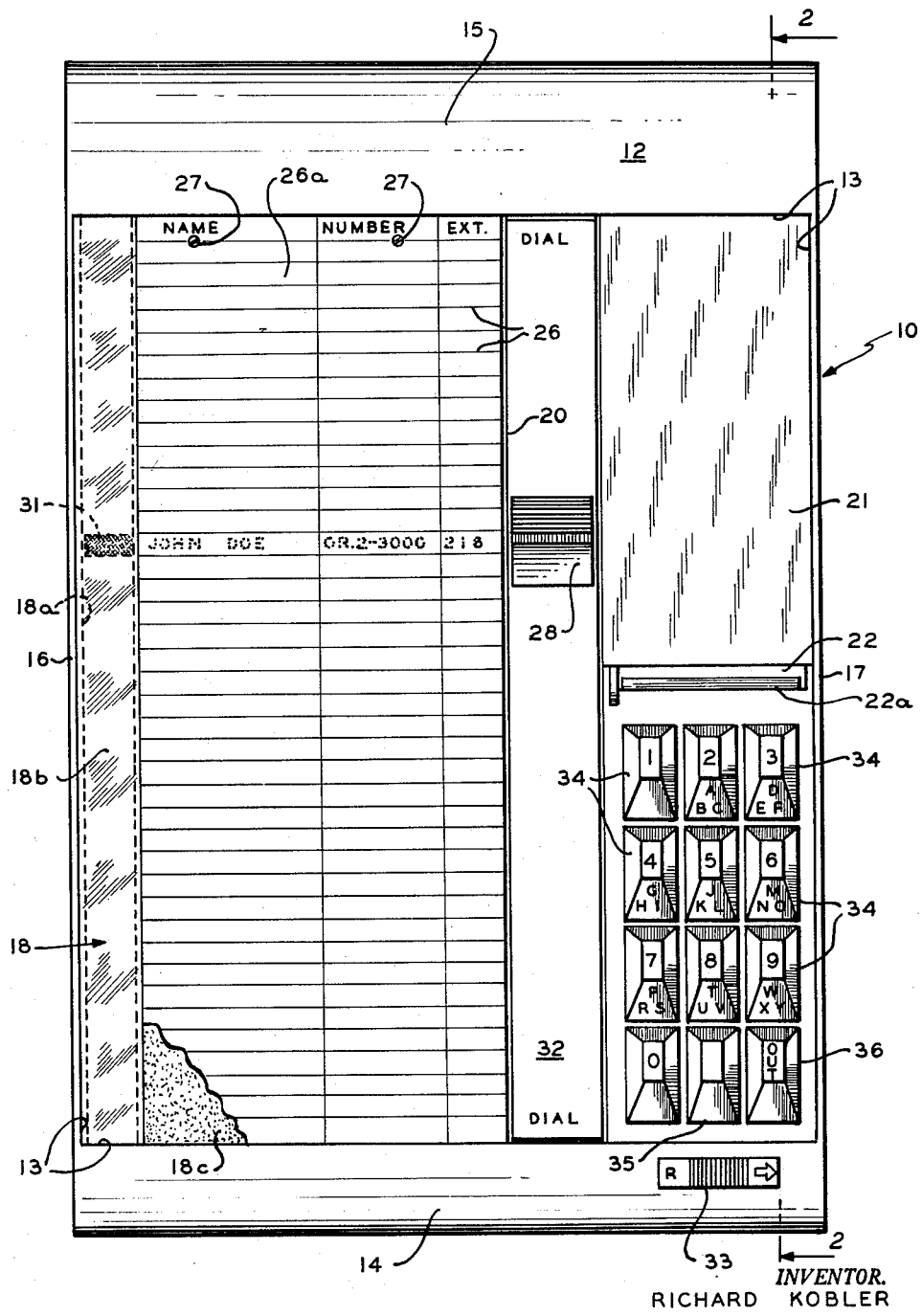
FIGURE 1 is a plan view of a repertory telephone dialer in accordance with the invention showing the machine in record condition (dial lid open)
Figure 2:
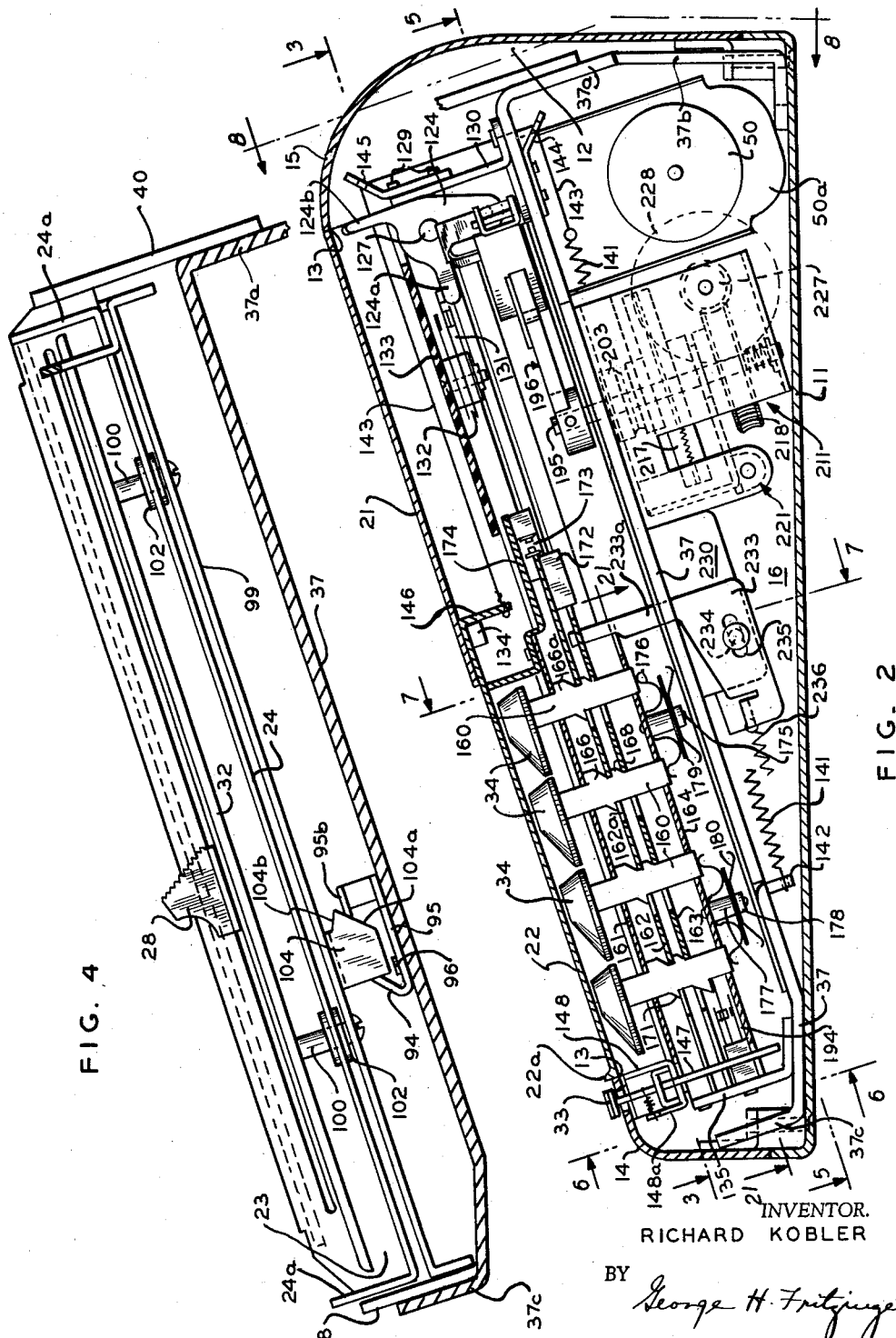
FIGURE 2 is a vertical sectional view taken on the line 2—2, FIGURE 1, but showing the machine in reproduce-standby condition (dial lid closed)

The present repertory dialer is housed in a case 10 which is rectangular as viewed from the top (FIGURE 1) but which has its top side downwardly inclined about 18 degrees to the front as shown in FIGURE 2. The case comprises a bottom pan-shaped section 11 supporting the internal frame structure and mechanism of the machine, and a top housing section 12 of an inverted pan-shape but of a rising height proceeding from front to back. The entire flat portion of the top side of the housing section 12 is cut away to form therein a large rectangular opening 13 surrounded by a narrow rim leading into downwardly curved walls 14 and 15 at the front and back and in the left and right vertical walls 16 and 17 at the sides. Inset from the top edge of the opening 13 and extending along the left wall 16 of the case is an angle iron 25 having two depending legs 25a by which it is carried by the frame structure therebelow (FIGURES 7 and 10). Closing a major left hand portion of the opening 13 from front to back is a plastic sheet cover 18 having a depending flange 18a (FIGURE 7) at its left side extending along the left side of the angle iron 25 and secured thereto by screws at 19 (FIGURE 10). This plastic sheet cover has an integral channel strip 18b at a clearance distance above the top side of the angle iron and flush with the top edge of the opening 13, and has a flat wall 18c extending from the right edge of the channel strip and inset from the top edge of the opening 13. This inset wall extends rightwardly to a vertical front-to-back extending partition wall 20. The recess 18b in the underside of the channel strip provides a front-to-back extending space for a pointer 31 for the head carriage as will later be described. The channel strip is of clear plastic to make the pointer readily visible, but the inset wall 18c is frosted so as to be translucent. The plastic sheet cover is supported along its right edge in a groove 20a in the partition wall 20.

Figure 3:
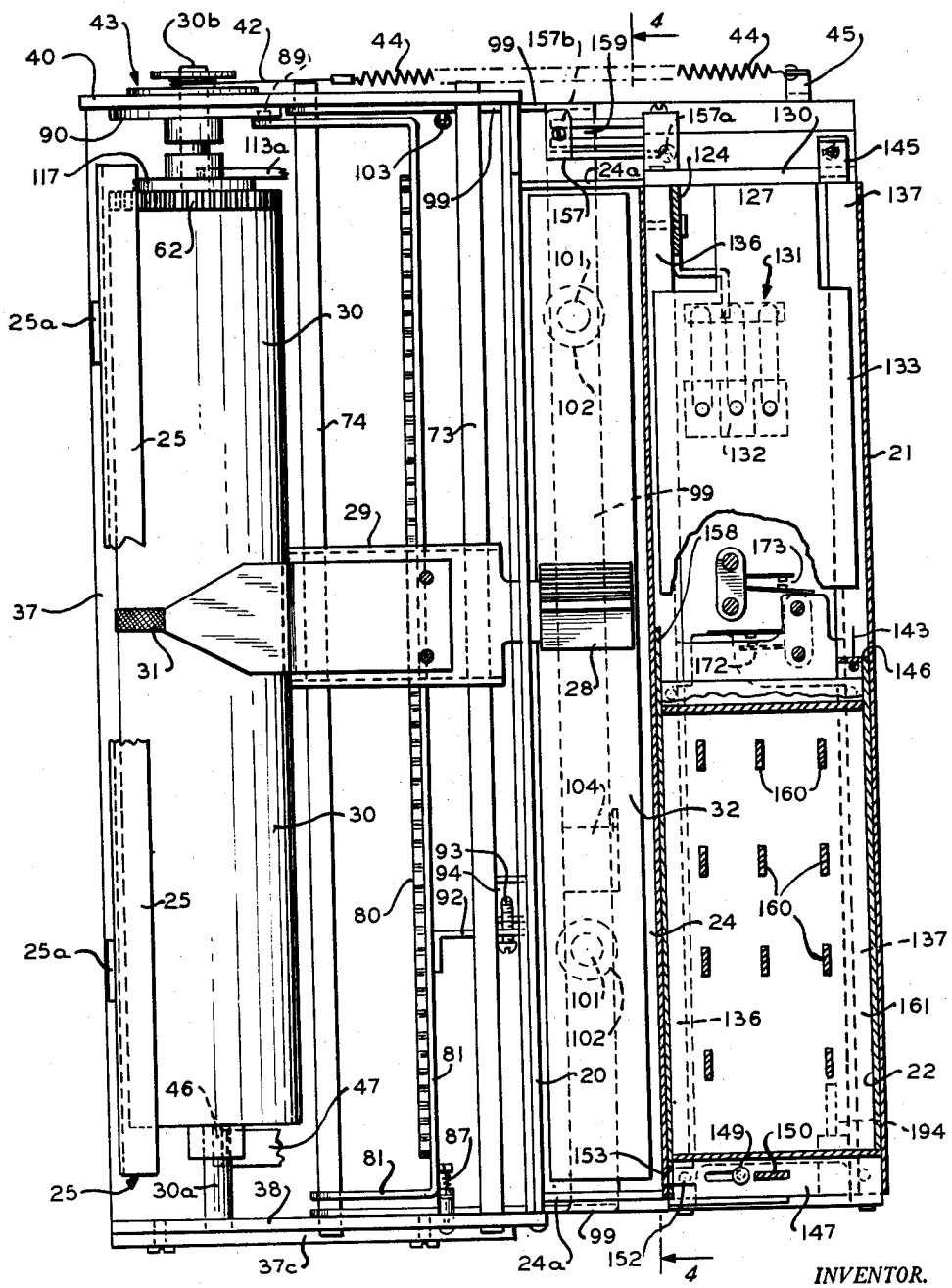
FIGURE 3 is a plan view of the mechanism with parts sectioned and broken away approximately on the line 3—3 of FIGURE 2.

At a distance to the right of the partition wall 20 there are two inverted channel-shaped covers or lids 21 and 22 each about one-half the length of the opening 13. The rearward cover is fixedly mounted but the front lid is slidable rearwardly and forwardly respectively into open and closed positions in telescoping relation with the cover 21. The downwardly extending flanges at the left sides of these covers form a wall which with the partition wall 20 form a trough 23 (FIGURE 7). This trough is closed by a wall 24 at the bottom secured by screws to the bottom side of the partition wall 20. End portions of the bottom wall 24 are turned upwardly near the front and back edges of the opening 13 to form end walls 24a for the trough (FIGURES 3 and 4).

The operable components of the machine accessible to manipulation of the user comprise a subscriber's list sheet 26a bearing a series of crosslines 26, for receiving subscribers' names and telephone numbers to be dialed, which sheet lies flat on the cover wall 18c and is hooked thereto as to two upstanding pins 27 (FIGURE 1), the sheet being preferably of laminated construction with print lines in the middle and with frosted outer surfaces for easier writing thereon; a scan knob 28 in the trough 23 secured to a head carriage 29 (FIGURE 3) and shiftable along the trough to place the head carriage in registration with respective side-by-side tracks on a magnetic drum 30, the carriage carrying the pointer 31 in the recess 18d along the left edge of the subscriber's sheet 25 to register with a subscriber's name on the list sheet as the head carriage registers with the respective telephone number recorded on the drum; a dial or playback bar 32 inset in the trough 23 below the scan knob along the length of the trough and pivotally mounted so that it can be depressed by a finger of the hand to start the machine running to dial out the subscriber's number selected by the setting of the scan knob; and a record button 33 extending above the front wall 14 of the case and shiftable to the right into a record position to shift the machine from its normal playback condition into a record-standby condition. When the record knob is so shifted to the right it unlatches the front lid 22 to cause the lid to be snapped rearwardly into open position by spring propulsion. The opening of the lid 22 exposes a set of ten pushbutton dial keys 34 of frusto-pyramidal shape numbered from 1 through 9 and 0 on their top faces and provided with dial letters on their front sloping faces, an idle key 35 and an "out" or access key 36 all positioned in a rectangular arrangement with three keys along the width of the lid 22 and four keys along the length thereof.

After shifting the scan knob to set the head carriage in registration with a track bearing either no recording or a recording of a telephone number to be superseded by another, and then shifting the record button 33 into its operated position to unlatch the dial lid 22, the user will push successively the respective dial keys 34 representing the letters and digits of the telephone number to be recorded on the magnetic drum, and in response to each key depression the machine will run momentarily to provide both an unrecorded and/or erased interdigital space along the selected track on the drum and then to record a dial signal representing the respective letter or digit. When the last of the digits of the telephone number has been so recorded, the user merely takes hold of a finger piece 22a on the lid 22 and draws the lid forwardly until it is latched closed. This causes the machine to run forwardly in erase to provide an unrecorded or erased space following the last digit recording which is longer than the unrecorded interdigital spaces, after which the magnetic drum is snapped back to its home position to restore the drum and head to their initial positional relationship. As in accordance with the teachings of my patent application Serial No. 657,378, filed May 6, 1957, this longer unrecorded end space is utilized during the playback to cause the magnetic drum to be snapped back to home position and reset the machine after a telephone number is dialed out.

Figure 5:
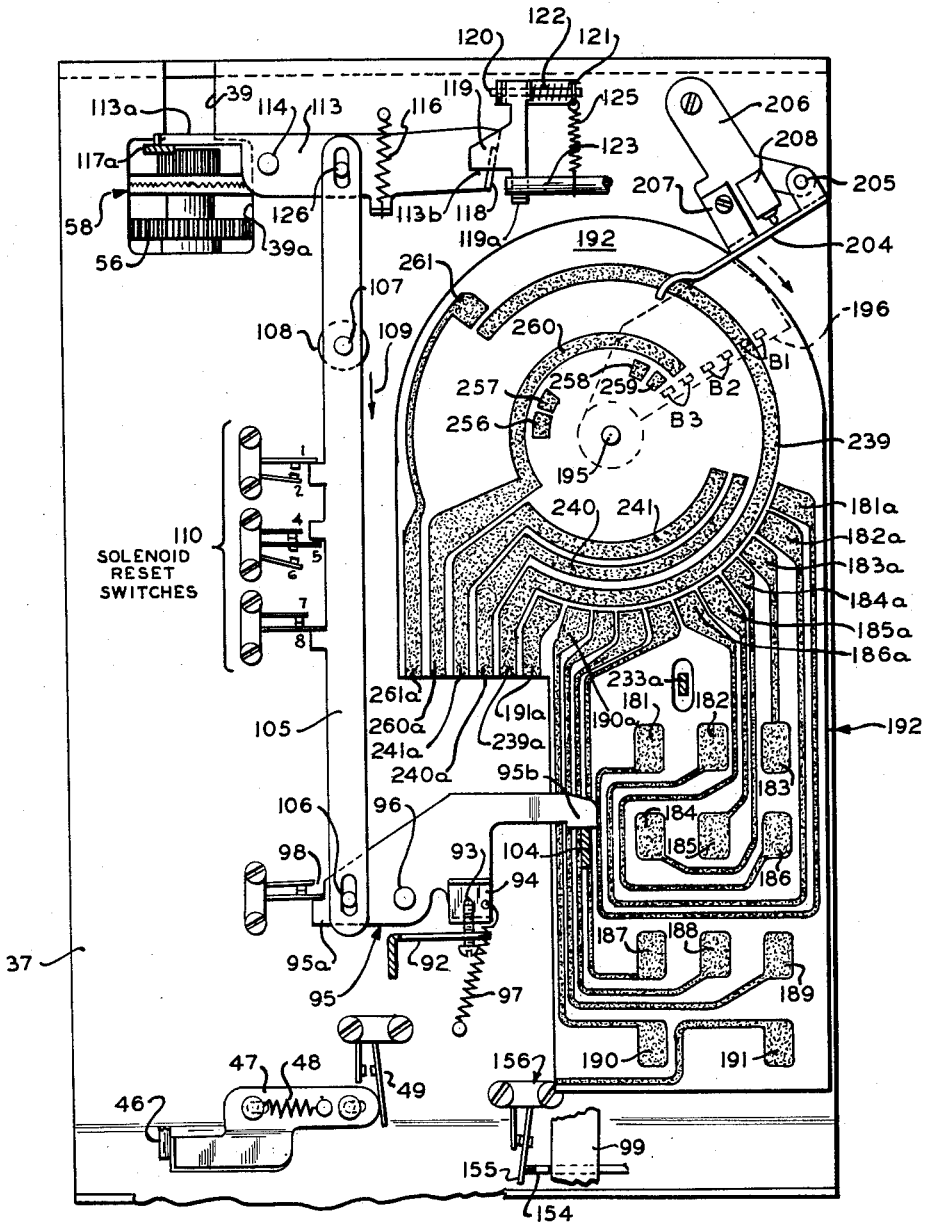
FIGURE 5 is an approximately horizontal sectional view taken on the line 5—5 of FIGURE 2.

The main frame of the machine comprises a flat plate 37 extending the width of the machine and supported parallel with the top inclined wall of the housing (FIGURES 2, 4 and 10). The plate 37 is supported directly on the bottom pan of the lower housing section at the front thereof but has a broad flange 37a bent downwardly at right angles at its rear end and merging into two depending feet 37b which are secured to the bottom pan at the rear of the housing (FIGURES 8 and 10). The magnetic drum 30 is supported above the frame plate 37 at the left side of the machine, the drum having a shaft extension 30a at its front end journaled in a wide upstanding plate 38 secured to an upstanding flange 37c of the frame plate 37 (FIGURES 3 and 10) and has a shaft extension 30b at its rear end journaled in the lefthand portion of a wide upstanding plate 40 secured to the flange 37a by screws 41 (FIGURES 3 and 8). The bracket 38 and plate 40 are secured at their right ends to the partition wall 20 and support the latter (FIGURE 3). The magnetic drum is biased clockwise as it appears from the rear end (FIGURE 8) by a cord 42 wound on a pulley 43 on the shaft 30b and leading from the bottom of the pulley to one end of a tension spring 44 extending crosswise of the machine, the fixed end of the spring being connected to an arm 45 secured rigidly to the flange 37a of the frame (FIGURE 10). Projecting from the front end of the drum is a pin 46 which abuts against a slide 47 on the frame plate 37 (FIGURES 5 and 9) to define the home position of the drum. The slide is lightly urged by spring 48 away from its stopped position defined by the limit on the pin slot mounting of the slide but the biasing force is less than the return force of the drum so that the slide will be shifted to the right to operate a so-called drum home lock switch 49 as the drum enters its home position (FIGURE 5).

Figure 18:
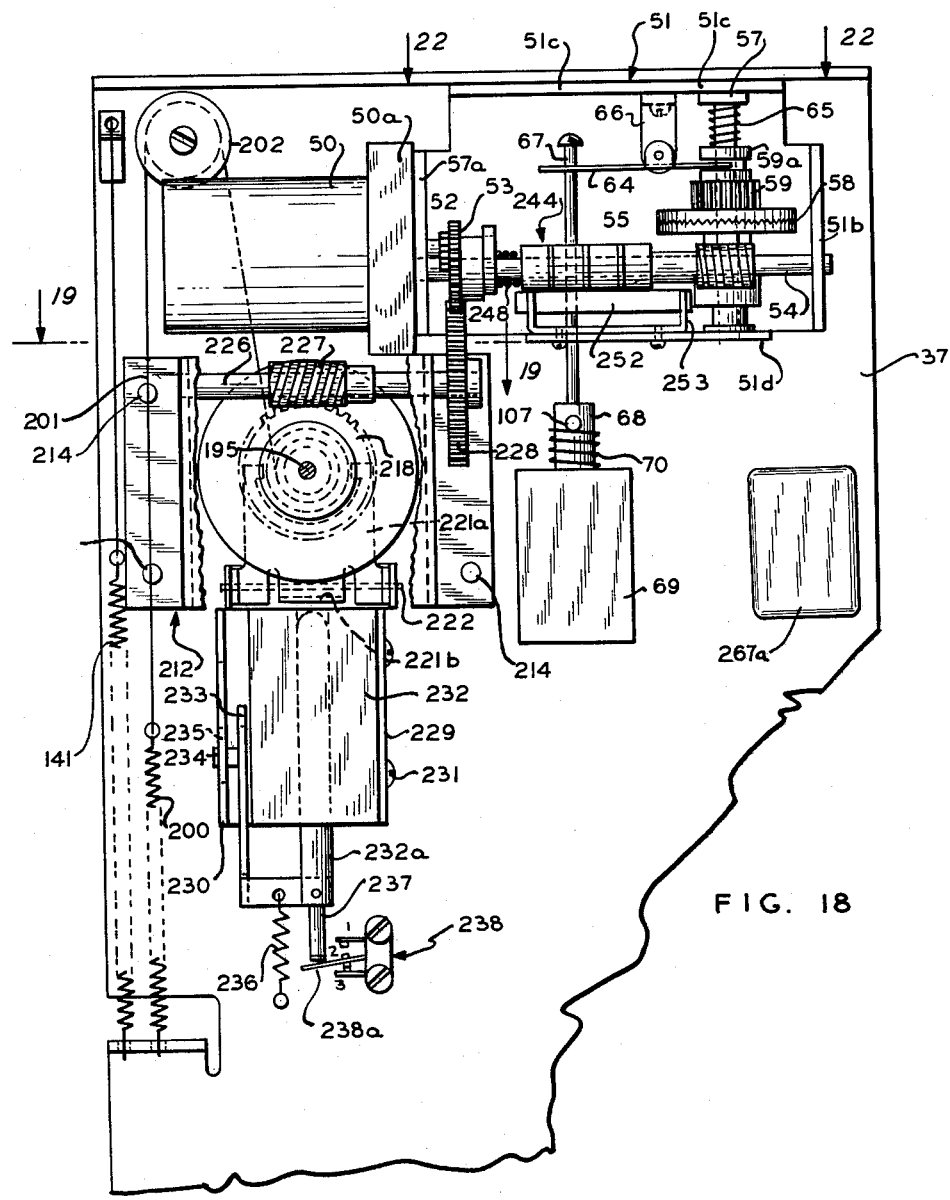
FIGURE 18 is a fractional bottom view of the mechanism of the machine as seen from a line parallel with the frame.

The magnetic drum 30 is driven by a motor 50 at the right side of the machine mounted below the rearward portion of the frame plate 37 in a crosswise direction, the motor having an end mounting through a heavy shield plate 50a to a depending leg 51a of a U bracket 51 secured to the underside of the frame plate 37 (FIGURES 8, 18 and 22). The motor has a drive gear 52 meshing with a gear 53 on a cross shaft 54 bridging the bracket 51 and journaled at its ends in the depending legs 51a and 51b thereof (FIGURE 8). At its left end the shaft 54 has a worm 55 meshing with a gear 56 pinned to a front-to-back extending shaft 57 parallel with the frame plate 37 and journaled in a second set of legs 51c and 51d depending from the bracket 51 (FIGURE 23). Secured to the rear end hub of the gear 56 is a toothed member 58a of a drive clutch 58 (FIGURES 10 and 23). The other clutch member 58b of this clutch is freely slidably and rotatably mounted on the shaft 57 and has an elongated pinion gear 59 meshing with an intermediate gear 60 journaled on a stud 61 secured to the plate 40 (FIGURES 8 and 10), there being a cutout 39 extending from the back edge of the frame plate 37 (FIGURE 5) to clear the stud, which cutout then merges with a wider cutout 39a to clear the top of the gear 56. The intermediate gear 60 in turn meshes with a gear 62 secured to the rear end of the drum 30 (FIGURES 3 and 8). The shiftable pinion gear 59 has a reduced diameter hub 59a (FIGURE 23) extending rearwardly thereof and provided with a peripheral slot 63 engaged by a forked lever 64 for shifting the rear clutch member to control engagement of the drive clutch, the clutch being normally engaged by compression spring 65 on the shaft 57 between the hub 59a and rear bearing for the shaft. The control lever 64 has turned over ears 64a intermediate its ends which are journaled to a bracket 66 secured to a back leg 51c of bracket 51 (FIGURES 18 and 23). The free end of the clutch control lever 64 is traversed by a headed pin 67 secured to an armature 68 of a so-called reset solenoid 69 (FIGURE 18) mounted on the underside of the frame plate 37. The headed pin 67 is at a distance from the control lever 64 to provide a lost motion coupling so that the reset solenoid can operate certain control switches before the drive clutch is disengaged, as will appear. When the reset solenoid is not energized its armature is held in a rearward position by compression spring 70, the head of pin 67 being then displaced rearwardly from the control lever 64. When the reset solenoid 69 is actuated the armature 68 is propelled through its lost motion coupling with the lever 64 and thereby builds up momentum before it disengages the drive clutch.

The head carriage 29 is in the form of a plate having two sets of turned-down apertured ears 71 and 72 at opposite sides thereof (FIGURES 3 and 7) which embrace slidably a set of parallel rods 73 and 74 extending along the magnetic drum 30 and supported at their ends by the frame plates 38 and 40 (FIGURE 3). The magnetic head 75 is mounted on a U-shaped rocker 76 on the support rod 74 between the ears 72 of the head carriage with the side arms of the rocker being confined by the ears 72 so that the head 75 is carried with the carriage without play. The head 75 is biased against the magnetic drum by a suitable spring between the head carriage and rocker not shown. An arm 78 secured to the top side of the head carriage extends leftwardly across the top of the magnetic drum and has the tip thereof turned upwardly and backwardly on itself to form the pointer 31 aforementioned, this being the pointer in the recess 18d in the underside of the channel strip 18b of the plastic cover sheet 18.

The head carriage has an arm extending rightwardly therefrom through a slot 20b in the partition wall 20 and on which is mounted the scan knob 28. In the present machine the carriage is never moved along the magnetic drum except by the scan knob since the carriage is at standstill during operation of the machine. Each side-by-side peripheral track on the magnetic drum is adapted for receiving a single telephone number. Successive tracks are separated from center to center by approximately ⅜″. In order that the carriage will be "over center" biased into successive positions wherein the head registers with successive tracks, as the carriage is shifted along the magnetic drum, a detent bar 80 is provided below the carriage along the length of the drum on a bail 81 pivoted on the end portions of the carriage support rod 74 (FIGURE 3). The detent bar has successive arcuate notches 82 and intervening dwells 83 in its top edge separated by the distances between successive tracks (FIGURE 12). On the underside of the head carriage there is a depending U bracket 84 straddling the detent bar and carrying a cross-pin 85 on which is journaled a roller 86 that rides on the notched upper edge of the detent bar (FIGURE 11). In response to a tension spring 87 connected between the bail 81 and a pin on the frame plate 38 (FIGURE 3) the bail is biased upwardly to urge the detent bar against the roller 86. As the carriage is shifted along the drum the detent bar is cammed downwardly intermittently as the roller rides onto the successive dwells and is snapped upwardly intermittently as the roller comes into registration with the successive notches. Further, as the roller passes a side edge of each notch the upward biasing force on the detent bar is effective to cam the head carriage into an "in-track" position wherein the head is in exact registration with the respective track on the drum.

Depending from the back leg of the bail 81 is an arm 88 carrying a cross pin 89 which traverses the thickness of a disc 90 pinned to the shaft extension 30b of the magnetic drum (FIGURE 11). In the disc there is a single peripheral notch 91 which registers with a pin 89 on the bail when the drum is in its home position. When the head carriage is in an "in-track" position the bail is in its most clockwise position as seen in FIGURE 11 and the pin 89 is disengaged then from the disc 90 to allow the drum to be driven from home position. However, if the head carriage is between tracks the roller 86 registers with a dwell 83 to hold the bail 81 in a counterclockwise position with the pin 89 then engaging the notch 91 and locking the drum against rotation. Vice versa, once the drum has been moved about 300 milliseconds from home position the peripheral edge of the disc 90 forms an obstruction to the pin 89 to provide a scan lock on the head carriage preventing it from being then shifted out of its "intrack" position.

Secured to the bail 81 is an L bracket 92 (FIGURE 3) having a rightwardly extending arm provided with an adjustable screw 93 threaded therethrough in directions parallel with the bail. The tip of this screw abuts slidably against an upwardly inclined cam lug 94 on a control lever 95 pivoted at 96 to the frame plate 37 (FIGURE 5) so as to cam the control lever counterclockwise as the detent bar 80 is depressed. When the detent bar 80 is moved upwardly into an "in track" positioning of the head carriage the control lever 95 is returned clockwise responsive to a tension spring 97. The control lever 95 has a finger 95a controlling a so-called motor track safety switch 98 to allow this switch to be opened responsive to its own bias when the detent bar is in a depressed position representing an out-of-track positioning of the head carriage and to close the switch to prepare the motor circuit when the detent bar is in a raised position representing an "in track" position of the head carriage.

The aforementioned dial bar 32 in the trough 23 is carried by a bail 99 below the bottom wall 24 of the trough through two vertical posts 100 (FIGURE 7) which extend through clearance holes 101 (FIGURE 3) in the wall 24, the clearance openings being closed by felt washers 102 to prevent ingress of dust and dirt to the internal mechanism. The arms of the bail 99 extend leftwardly along the frame plate 37 and then curve obliquely upwardly to points whereat they are pivoted on the carriage support rod 74. The bail 99 is biased by a tension spring 103 (FIGURE 8) into a raised position wherein the dial bar 32 is just at a clearance distance below the bottom side of the scan knob 28.

The control lever 95 which is cammed intermittently by the detent bar 80 as the head carriage is shifted along the drum 30 as before described has a rightwardly and upwardly extending finger 95b terminating directly below an intermediate portion of the bail 99 carrying the dial bar 32 (FIGURE 4). Secured to this intermediate portion of the bail 99 is a depending bracket 104 having an inclined back edge 104a slidably engaging a front edge of the finger 95b and terminating into a catch element 104b for hooking to the underside of the finger 95b to latch the dial bar when the dial bar is fully depressed. By the camming action between the edges 104a and 95b the control lever 95 is cammed counterclockwise momentarily to open the motor track safety switch 98 until the dial bar is fully depressed into a latched operated position. If the scan knob is between tracks control lever 95 is held by action of pin 93 against cam lug 94 in a counterclockwise position causing motor track safety switch 98 to be open (preventing starting of the machine)

and finger 95b to be displaced from catch 104 preventing the dial bar from being then latched.

The control lever 95 is also shifted counterclockwise when the reset solenoid 69 is operated. This is done by means of link 105 having a lost-motion pin-slot connection 106 to the lever 95 (FIGURE 5) and having a pin 107 staked to the link and depending through a clearance opening 108 in the frame plate 37 and in turn staked to the armature 68 of the reset solenoid (FIGURE 18). In the normal unoperated position of the reset solenoid the lost-motion pin-slot connection 106 permits the small counterclockwise movement of the control lever 95 induced by shifting the head carriage and by depressing the dial bar as before described. When the reset solenoid 69 is operated the link 105 is propelled forwardly in direction of the arrow 109 to take up firstly the lost-motion coupling with the control lever 95 and then to shift the control lever counterclockwise at the end of its stroke to open the motor track safety switch 98 and to unlock the dial bar in case the same was then in a latched position. The movement of the link 105 produced by the reset solenoid is utilized to actuate a set of reset switches 110 shown in FIGURE 5, the purpose of which is hereinafter described.

At the rear of the machine (FIGURE 8) is a drum switch 111 having contacts 1–2 referred to as the drum mute switch and contacts 2–3 referred to as the drum end switch. Pole member 111a engages rear flange of pulley 43 having notch 43a and bump 43b causing mute switch 1–2 to close when drum has advanced about 300 milliseconds from home and end switch 2–3 to close also when drum has advanced about one revolution from home.

When the magnetic drum 30 is started from home position in a recording operation, the recording function is delayed about ⅓ second by means of a record switch control lever 113 (FIGURE 5) pivoted at 114 to the top side of the frame plate 37 and having a leftwardly extending arm 113a bearing under tension of a spring 116 against a radial finger 117a of a disc 117 secured to the back side of the gear 62 on the rearward shaft extension 30b of the magnetic drum (FIGURES 3, 5, 10 and 13). By this abutment of arm 113a against finger 117a the control lever 113 is maintained normally in a clockwise position. When the control lever 113 is in such clockwise position an upstanding cam lug 113b at the right end of the lever permits a record latch lever 119 pivoted on a cross pin 120 carried by a bracket 121 on the top side of the frame plate 37 to be in a lower unlatching position—a position in which it is biased by a torsion spring 122 on the pin 120 (FIGURES 5 and 14). The record latch lever 119 has an upwardly curved finger 119a at its free end which when the lever is in its downmost position corresponding to the home position of the magnetic drum just clears a cross pin 123 of a rocker 124 which controls the record-reproduce conditioning of the machine as later described, the reproduce condition of the machine being obtained when the rocker 124 is in its full line positioning shown in FIGURES 14 and 15 and the record condition of the machine when the rocker is shifted counterclockwise placing the cross pin 123 thereof in its dash-dot position. By predetermining the width of the finger 117a (FIGURE 13) the control lever 113 is not released into its counterclockwise position until the drum has moved approximately ⅓ second from home position. Thus, if the record-reproduce rocker is first shifted from its reproduce position in which it is normally held by spring 125 to its record position and the drum is started, in about ⅓ second the lever 113 is snapped counterclockwise to raise the latching lever 119 in its operative position wherein the finger 119a thereof is ahead of the cross pin 123 on the rocker 124 to latch the rocker in its record position. If the machine was started in reproduce condition, after ⅓ second the latch 119 is shifted into operative position shown in FIGURE 15 to latch the machine in reproduce condition. Thus, whether the machine is started in record or reproduce condition, after about ⅓ second of movement of the drum from home position the machine becomes latched in that condition and is not returned until it is later reset to a start position in playback-standby condition.

The link 105 connected to the armature of the reset solenoid 69 is extended rearwardly from its pin connection 107 and provided also with a lost-motion pin-slot connection 126 to the control lever 113 (FIGURE 5). This lost-motion connection permits the counterclockwise control movement of the control lever above described while the link 105 is in its normal position which it has when the reset solenoid is not operated. However, operation of the reset solenoid shifts the control lever 113 clockwise to its normal position to release the latch and to free the arm 113a of the control lever from the path of the finger 117a so that the magnetic drum is free to return to home position wherein the finger 117a is again effective to retain the control lever 113 in normal position.

The record-reproduce rocker 124 is pivoted at 127 below the fixed cover 21 (FIGURE 2) at the rear of the machine, the pivoting being to a rail 136 secured at its rear end to an L bracket 130 upstanding from the rear end of the frame plate 37. The rocker 124 has a forwardly extending arm 124a which controls a multiple switch referred to herein as the record (RS) switch 131 (FIGURE 15). This switch is mounted in an insulating stack 132 secured to an insulating plate 133 mounted between the rail 136 and a second rail 137. Also the rocker 124 has an upstanding finger 124b in the path of a lug 134 on the rear end of the dial lid 22 to cause the rocker to be shifted into record position by the opening of the lid when the lid reaches its fully open position (FIGURES 2 and 15).

The bracket 130 at the back of the machine and an L bracket 135 at the front of the machine (FIGURE 2) carry the two rails 136 and 137 in a parallel laterally spaced relation (FIGURE 6) throughout the length of the opening 13. Among other functions these rails carry the channel shaped covers or lids 21 and 22. The back cover 21 has relatively deep side walls embracing the two rails and secured thereto by screws 138 (FIGURE 7). The front lid 22 has side walls of lesser depth provided with inwardly turned flanges 139 (FIGURE 7) at their lower edges which slidably engage respective grooves in the outside walls of the rails to provide a slidable mounting for the lid permitting it to be moved in telescoping relation with the back cover into open and closed positions. The lid 22 is biased into open position by means of a long tension spring 141 below the frame plate 37 connected to a lug 142 at the front of the machine and connected at its rearward end to a cord 143 which is lead through an eye 144 at the back of the bracket 130 (FIGURE 2) then upwardly to a second eye 145 at the top of the bracket 130 and then forwardly below the cover 21 to a lug 146 turned down from the back edge of the movable lid 22.

The lid 22 is latched in its closed position by means of a slide 147 (FIGURES 2, 3 and 6) mounted just back of the front bracket 135 on a channel member 148 bridging the rails 136 and 137 at the front end thereof, the slide constituting a bar having a pin-slot connection 149 (FIGURE 3) to the channel member 148 and having an upright metal strip 150 secured to the right end of the bar the upper end of which is attached to the record button 33 overlying the front curved wall 14 of the case (FIGURE 1). A spring 151 is connected between the upright strip 150 and a lug 148a turned up from the channel member 148 to bias the slide leftwardly (FIGURE 6). Extending leftwardly from the slide through the path of the left wall of the movable lid 22 is a latching finger 152 (FIGURE 3) for hooking into an opening 153 in the side wall of the lid to hold the lid closed. Upon shifting the button 33 to the right, the latching finger 152 is disengaged from the hole 153 and the lid 22 is snapped open by the spring 141. Upon taking hold of the finger piece 22a and moving the lid forwardly into closed position the left side wall thereof strikes an inclined edge at the back side of the latching finger 152 and cams the slide 147 to the right until the finger registers with the hole 153 and engages the same to latch the lid closed.

The upright metal strip 150 of the slide 147 is curved leftwardly at the bottom and extended along the frame plate to a position below the dial bar, whereat it terminates in an upwardly curved finger 154 (FIGURES 5 and 6). This finger bears against an arm 155 of a single-pole, double-throw switch 156 herein referred to as the motor reset safety switch. When the bail 99 which carries the dial bar is in its depressed latched position it stands to the right of the finger 154 (FIGURE 6) so as to then latch the record button in its normal position.

Mounted on the bail 99 back of the rear wall 24a of the trough 23 is an upstanding bracket 157 having a rightwardly extending arm 157a (FIGURES 3 and 8) which when the lid 22 is in its open position overlies a rearwardly extending finger 158 on the left wall of the movable lid whereby to latch the dial bar 32 against being depressed into its operate position while the lid is open. Since the opening of the lid 22 is the operation which shifts the machine into recording condition, this interlock between the lid and the bail 99 prevents the dial bar from being inadvertently operated while the machine is in recording condition.

Extending rearwardly from an upper portion of the bracket 157 on the bail 99 is an ear 157b through which is threaded vertically a screw 158. The lower tip of this screw contacts a center leaf of a pair of blade switches 159 mounted in an insulating stack secured by the screws 129 to the bracket 130 (FIGURE 8), these switches being herein referred to as the playback (PS) switches. These switches stand normally in open position and are closed as the dial bar is depressed.

The set of dial keys 34 are mounted below the front lid 22 on respective vertical bars 160 (FIGURES 2 and 7) which extend slidably through respective rectangular slots in a set of four parallel plates 161 to 164. The top and bottom plates 161 and 164 are frame plates bridging the rails 136 and 137 and secured by screws 165 to the top and bottom sides. The upper and lower intermediate plates 162 and 163 are respectively so-called "inhibition" and "detent" plates mounted slidably at their opposite edges in respective grooves in the inside walls of the two rails and both biased forwardly by suitable springs not shown. The bars 160 of the dial keys have straight top and bottom portions which guide the keys vertically in the frame plates 161 and 164. However, on the back edge of each key bar 160 there is a cam 166 having a dwell 166a for engaging the back edge of the respective slot in the inhibition slide plate 162 to cam this plate rearwardly against the resisting force of its spring bias and then to maintain the plate in its rearward position by the dwell 166a while the key is held in its depressed position. Normally, the top edge of each cam 166 abuts against the bottom face of the top frame plate 161 to define the raised or unoperated position of the key. Also, there is on the back edge of each key bar between the inhibition and detent plates 162 and 163 a cam-latch element 168 which as the key is depressed engages the back edge of the respective slot in the detent plate 163 and cams it momentarily to the rear until the cam-latch element passes the plate, whereupon the detent plate is snapped forwardly by its spring bias to latch the key bar in an operated position. However, the full stroke of each key is such that the key has a further downward movement after the cam-latch element 168 passes the detent plate 163 to the extent that as the key nears the end of its downward stroke the upward cam 166 will engage the rear edge of the respective slot in the detent plate 163 and also cam it rearwardly. In fact, when the key is released from its downmost position it is returned partially by its upward biasing means hereinafter described until the cam 166 rides free of the detent plate 163 and the cam-latch element 168 engages the underside of the detent plate but with the inhibition plate 162 remaining engaged with the dwell 166a. Thus, upon depressing a dial key through a first portion of its downward stroke the upper inhibition plate 162 is cammed rearwardly by its cam 166 and the detent plate 163 is momentarily cammed rearwardly by the cam-latch element 168, and during a second portion of the downward stroke the inhibition slide is maintained in its rearward position by the dwell portion of the cam 166 and the detent plate is again held in its rearward position now also by the cam 166. Although the spacing between the cam 166 and the cam-latch 168 would permit a momentary return of the detent plate during an intermediate portion of the downward stroke of each dial key the resisting force on each key is so greatly relieved as the latch element 168 passes the detent slide that the key is snapped downwardly so fast by the pressure then exerted thereagainst that the detent slide remains in its rearward operated position during the last portion of the downward stroke of the dial key. However, when the dial key is released from its downmost position the cam 166 rides free of the detent slide allowing the detent slide to return to its normal position and the latch element 168 then engages the underside of the detent slide to latch the key in its operated position.

On the forward edge of each key bar 160 is a catch element 171 at a level just above the top face of the inhibition slide plate 162. When any one of the keys is in a latched position it holds the inhibition slide plate 162 in a sufficiently rearward position to cause the portion of the slide plate directly ahead of the respective slot through which the key passes to lie below the catch 171 with the result that when any one key is latched in an operated position all other dial keys are latched in their unoperated positions.

The inhibition slide plate 162 carries a dial motor switch 172 on its rear end portion, comprising two leaf spring contacts mounted sidewise relative to the direction of movement of the plate. The leaf spring contact of switch 172 which is towards the back of the machine is engaged by the back edge of the detent plate 163 normally to hold the dial motor switch open (FIGURE 3). In the initial downward movement of a dial key the slide plates 162 and 163 are both moved rearwardly substantially in unison by the respective cams 166 and 168 without closing the dial motor switch. Furthermore, as beforedescribed, when the latch cam element 168 of a dial key passes the detent plate 163 the resisting force on the dial key is so greatly reduced that the key is shifted with a snap movement to its end position without allowing the detent plate to return momentarily to unoperated position. Thus, the dial motor switch is not operated closed during the downward depression of a dial key nor so long as the dial key is held in its downmost position. However, when a dial key is next released to return to its latched position the inhibition plate 162 is maintained by the dwell 166a in its displaced position but the detent plate is released from the cam 166 and returned to its unoperated position with the result that the dial motor switch 172 is then closed responsive to the relative movement of the detent plate to the inhibition plate.

Additionally, there is provided a dial solenoid control switch 173 mounted on a bracket 174 below the fixed cover 21. This switch comprises also two normally open leaf spring contacts mounted sidewise of the direction of movement of the inhibition slide plate 162 and having its pole member so positioned that when this plate is in its displaced operative position it presses against the pole member and holds the dial solenoid control switch closed (FIGURES 2 and 3).

Figure 25:
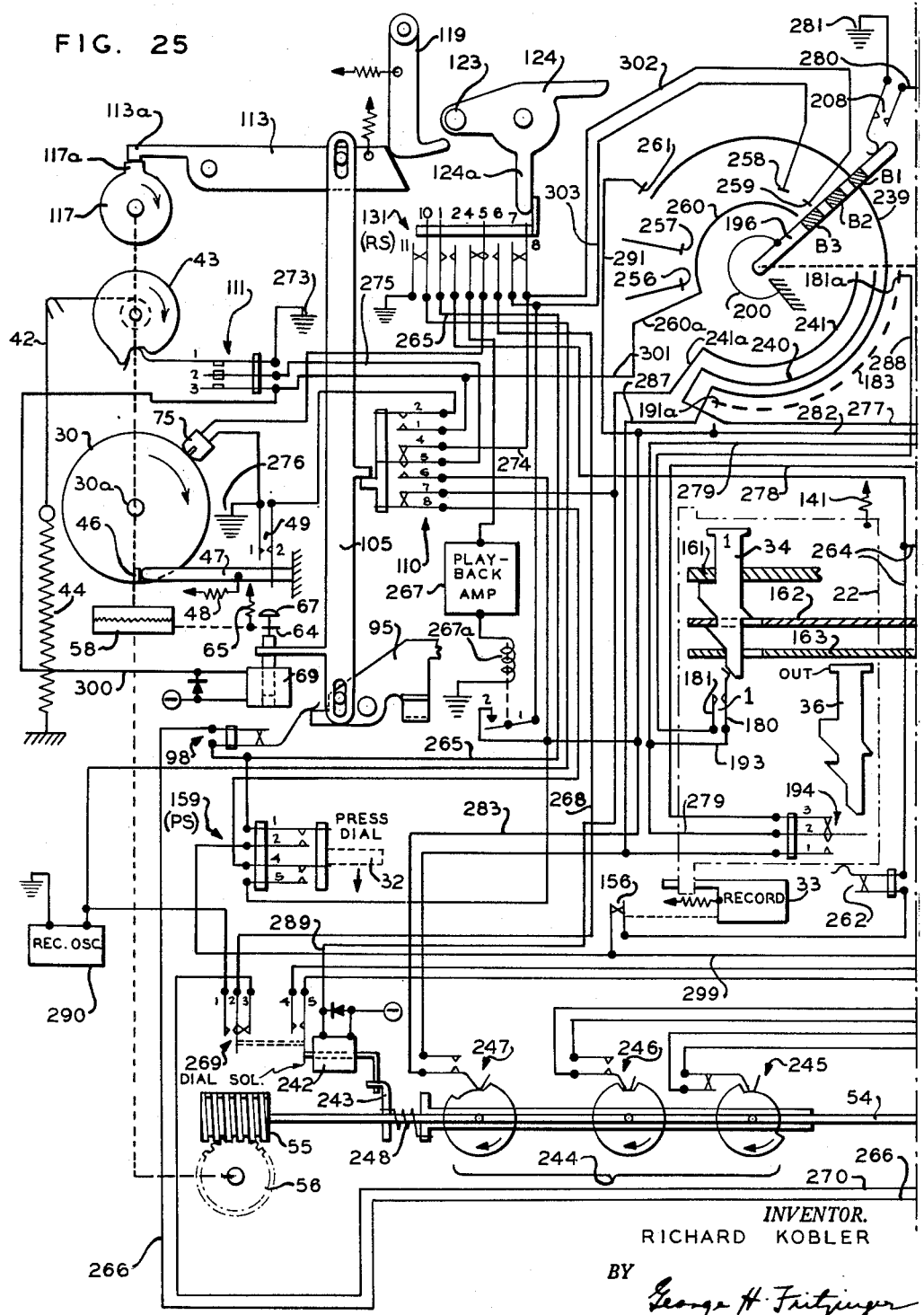
FIGURE 25 (and 25a) is a schematic circuit diagram of the repertory dialer.

Each dial key is upwardly biased by a means which forms also a respective dial timer switch operated directly by the dial key when the same is depressed. To this end then are provided centrally mounted double-ended cantilever-type return springs 176 between adjacent pairs of the key bars 169, which are secured by rivets 175 to the bottom frame plate 164 as shown in FIGURE 2. The springs 176 have arcuately bowed arms the tips of which bear upwardly against the bottom edges of the respective key bars. The rivets 175 are elongated and provided with insulating washers 177 and 178 between which are clamped respectively insulating strips 179 as of mica and centrally mounted double ended cantilever-type contact springs 180. At a space below the tips of these contact springs there are respective terminals 181–191 of a printed circuit board 192 corresponding respectively to the dial keys 1 to 0 and to a so-called "outdialing" key. As a dial key is depressed it moves against a respective return spring 176 causing the central bowed portion of the respective arm thereof to move against the adjacent insulating bar 179 and the latter in turn to move against an intermediate portion of the respective arm of the contact spring 180 so as to engage this contact spring with the respective terminal 181–191. By this engagement the terminal is connected through the respective rivet 175, frame plate 164—which itself is insulatedly mounted on the plastic rails 136 and 137—and lead wire 193 into the electrical circuit system of the machine as shown in FIGURE 25. The switches so operated directly by the dial keys are herein called dial timer switches because they are in the circuits which control the time duration of the signal bands recorded on the magnetic drum when the respective dail keys are depressed, the switch so formed with terminal 181 being herein referred to as dial timer switch 1, with terminal 182 as dial timer switch 2, and etc.

The terminal 191 directly below the "out" dial key is an idle one having no connection in the electrical system of the machine; instead, the "out" dial key is caused to operate directly a single pole, double-throw cantilever-switch 194 herein referred to as the outdialing switch. This outdialing switch is mounted above the bottom frame plate 164 on the side rail 137. The switch is normally closed with one contact and is shifted closed to the other contact when the "out" dial key is pressed into a latched position.

The printed circuit board 192 (FIGURE 5) has a rearward portion behind the dial keys comprising a group of conductor strips and terminals arcuately arranged in six concentric lanes around a central shaft 195. Secured to the shaft 195 is a switch arm 196 (FIGURE 16) which engages the respective lanes to form a so-called advance clutch timer switch of the machine. This is the timing switch which determines the length of the interdigital erase spaces and of the recorded signal bands on the record when the respective dial keys are depressed. The switch timer arm 196 is a wide flat strip of insulating material having three transversely disposed U-shaped spring fingers 197a, 197b and 197c mounted in cantilever fashion on its top side at successive radial distances from the hub corresponding to the radial distances of the successive lanes, the free ends of these springs bearing respectively against brush sets B1, B2 and B3 which extend slidably through apertures in the arm and bear slidably against the lanes 1–2, 3–4 and 5–6 respectively, proceeding from the outside to the inside of the timer switch. The timer arm 196 is biased into home position shown by dash-dot lines in FIGURE 5 by means of a long tension spring 200 below the frame plate 37 (FIGURE 18) connected to the frame at one end and to a string 201 at the other end, the string being trained around an idler pulley 202 and wound onto a V pulley 203 secured to the shaft 195 (FIGURE 19). The home position of the timer arm is defined by a switch lever 204 (FIGURE 5) pivoted on a stud 205 secured to a bracket 206 mounted on the frame plate 37. The switch lever is itself biased from home position by cantilever spring 207 but with a lesser force than the return force applied to the timer arm so that the timer arm will always overpower the cantilever spring 207 and come to a definite stop. However, when the timer arm is driven from home position the switch lever 204 will sing forwardly a short distance under influence of its bias to allow a push button switch 208 to close, this being the switch herein termed the advance clutch home lock switch. Once the timer arm is driven from home position the home lock switch 208 remains closed until the timer arm is again returned home.

carried by a sub-frame assembly 211 shown in FIGURES

The shaft 195 is journaled in bearings 209 and 210 19 and 20. This sub-frame assembly comprises an outer U bracket 212 having out-turned feet straddling an opening 213 in the frame plate 37 and secured to the underside of the frame plate by screws 214. Within the U bracket 212 is a smaller U bracket 215 bridging the former and secured thereto by screws 216. The cross member of the bracket 215 is disposed in the opening 213 flush with the frame plate 37. The shaft bearings 209 and 210 are carried respectively by the cross members of the bracket 212 and 215. The pulley 203 is pinned to the shaft 195 within the sub-frame assembly 211 and is coupled by a clutch 217, herein referred to as the advance clutch, to a gear 218 staked to a hub 219 freely journaled on the shaft 195 (FIGURE 20). The clutch 217 comprises two toothed discs one of which is integral with the pulley 203 and the other of which is integral with the hub 219. The clutch is normally held engaged by a compression spring 220 on the shaft 195 between the hub 219 and the bearing 209, and is disengaged by a bell crank 221 hinged at 222 to the lower end of a U bracket 223 depending from the bracket 215. The bell crank 221 has a forked arm 221a engaging a peripheral groove 224 in the hub 219, and has an arm 221b extending upwardly within the U bracket 223 such that when pressure is exerted leftwardly against the arm 221b as it appears in FIGURE 20, the clutch is disengaged.

Journaled in bearings 225 in the side arms of the bracket 212 is a shaft 226 having a worm gear 227 secured thereto and in driving engagement with gear 218 (FIGURES 19 and 20). Secured to the righthand end of shaft 226 beyond the bracket 212 is a gear 228 in mesh with the aforementioned gear 53 driven by the motor 50. Thus, whenever the motor 50 is running and the clutch 217 is engaged the timer shaft 195 is driven to rotate the timer arm 196 in a clockwise direction from its home position, the rate of rotation of the timer arm being one full revolution in four seconds. When the motor is stopped the timer arm is held in its advanced position by the worm gear 227–218 acting as a brake, and when the clutch 217 is disengaged the timer arm is snapped back to home position by the return spring 200.

Turned downwardly from the frame plate 37 ahead of the bell crank 221 are two laterally spaced lugs 229 and 230 (FIGURE 18). Secured by screws 231 to the rightward lug 229 (as it appears in FIGURE 18) is an advance clutch solenoid 232 having a plunger 232a which when the solenoid is activated is propelled against the bell crank arm 221b to disengage the advance clutch. The operating stroke of the plunger is determined by a side arm 233 which is secured to the front end of the plunger and disposed alongside the solenoid and which carries a transverse pin 234 slidably engaging a limit slot 235 in the lug 230 (FIGURE 2). The plunger is normally held retracted by tension spring 236. In this retracted position a forwardly extending pin 237 in the plunger (FIGURE 18) bears against the pole member 238a of an advance clutch solenoid switch 238 to hold the number 2 and 3 contacts of the switch closed. When the solenoid is energized the plunger is driven rearwardly against the arm 221b of the bell crank 221 to disengage the advance clutch 217 and the plunger is released from the switch 238 to cause the switch to close on its 1 and 2 contacts. Additionally, by means of a finger 233a upstanding from the side arm 233 and extending through a clearance slot in the frame plate 37 with its upper end in engagement with the detent plate 163 (FIGURE 2), this detent plate is propelled rearwardly by energization of the advance clutch solenoid to unlatch the dial key last depressed concurrently as the advance clutch is disengaged.

The two outer concentric lanes of the timer switch have an inner slip-ring 239 about 270 degrees long and so positioned that the brush B1 engages the same about midway its length when the timer arm 196 is in home position. The outer lane comprises a series of 10 "digit" terminals and "out" terminal starting at a timing distance of 490 milliseconds (in terms of movement of the timer arm from its home position) and spaced at 100 millisecond intervals. These terminals are connected by the printed circuit board respectively to the dial key terminals 181–191 and are given reference numbers 181a–191a respectively. As will appear, when a dial key is depressed the timer arm is started from its home position and an erase time band is started on the magnetic drum for a duration of 490 milliseconds until the timer arm reaches the first of the digit terminals 181a. Simultaneously as the timer arm reaches the first of the digit terminals the brush B2 of the timer arm contacts two slip-rings 240 and 241 in the two intermediate lanes of the timer switch to start the recording of a time band. The length of time band recording is controlled by the timer arm reaching that one of the digit terminals 181a–191a activated by the depressed dial key. Upon reaching that terminal a circuit therefrom to the slip-ring 239 is activated to operate the advance clutch solenoid whereby to disengage the advance clutch 217 to allow snap back of the timer arm to home position and to release the dial key last depressed. By means hereinafter described the length of the time band recorded on the magnetic drum when the digit 1 is depressed is cut short to approximately 35 milliseconds but for each higher digit key which is depressed there is an additional 100 milliseconds duration of time band recording. Thus, depressing dial key 2 will result in a time band recording of approximately 135 milliseconds, depressing key 3 in a time band recording of approximately 235 milliseconds etc. The depression of the "out" dial key 191 does not provide for recordation of any signal but provides instead for an unrecorded or erased "access" time of 1490 milliseconds for "out-dialing."

The two intermediate slip-rings 240 and 241 have an arcuate length equal to the angle subtended by the terminal group 181a–191a and the out terminal 239a of the slip-ring 239. Just beyond the terminal 239a the slip-rings have out terminals 240a and 241a. When the timer arm reaches terminal 181a the slip-rings 240 and 241 are bridged by the brush B2 to complete a circuit for a dial solenoid 242 shown in FIGURES 22 and 24. This dial solenoid has a hinged armature 242a (FIGURE 24) provided with an extending arm for latching a dog 243 freely journaled on a reduced diameter extension 53a of the gear 53 (FIGURE 22). Abutting against the hub extension 53a at one end and against the worm gear 55 at the other end is a so-called washout commutator 244 journaled on the shaft 54. This washout commutator comprises three cylindrical sections 245, 246 and 247 mounted end to end and separated by insulating washers 244a. On the shaft extension 53a is a one-way helical clutch spring 248 secured to the dog 243 at one end and to the commutator 244 at the other end. The spring is wound in such a direction that when the dog is latched against turning with the shaft 54 (FIGURE 24) the frictional grip of the spring on the hub 53a tends to unwind the spring and loosen it from the hub with the result that the washout commutator then stands still. However, when the dog 243 is unlatched so that it is free to turn with the hub 53a, the resisting drive force of the commutator tightens the spring on the hub and causes the commutator to be driven with the shaft 54 until the dog is again latched. Since there is only one point at which the dog can be latched in each revolution of movement, an unlatching of the dog will provide for at least one full revolution of movement of the washout commutator. The washout commutator is driven at a rate of one revolution in 100 milliseconds, but only 20 milliseconds activation of the dial solenoid is necessary to release the dog to provide for one full revolution of the commutator. If the dog is held released for slightly more than 100 milliseconds, the commutator will be driven through two full revolutions, and so forth. Slidably engaging the commutator sections 245–247 are respective pairs of spring contact wires 249–251 all mounted in an insulating rod 252 journaled at its ends in a U bracket 253 mounted on the back side of the front leg of the U bracket 51 (FIGURES 18, 22 and 24). These contact spring wires 249–251 are pressed against the commutator section by an adjusting screw 254 bearing against a short spring finger 255 in the insulating rod 252 (FIGURE 24).

In the outer one of the two innermost lanes of the timer switch there are four terminals 256–259 positioned respectively at timing distances of 2300, 2550, 3520 and 3770 milliseconds from home position of the timer arm. As will appear the contacts 256 and 257 are playback reset and record reset terminals respectively which may be connected in circuit, and alternatively the contacts 258 and 259 are also playback reset and record reset terminals which may be connected in the circuit in place of the prior terminals. The terminals 256 and 257 are to be used when the "out" terminal 191a is connected in circuit and the terminals 258 and 259 are to be used when an alternative "out" terminal 261 set at 2690 milliseconds from home position in the outermost lane is employed. Spanning the arc subtended by the four terminals 256–259 in the outer one of the two innermost lanes is a slip-ring 260 with a radial lead-out terminal 260a in the printed circuit board next to be terminal 241a (FIGURE 5). The slip-ring 260 and the adjacent lane including the terminals 256–259 are bridged by the innermost brush B3 of the timer arm.

The commutator section 245 is a pulsing switch provided with conductor and insulator segments causing the spring contacts 249 to be closed during 40 milliseconds of each revolution and open during the remaining 60 milliseconds thereof. The commutator section 246 is a record mute switch which holds the spring contacts 250 open only momentarily during the beginning and ending of each revolution of the commutator. The commutator 247 closes the switch in about 20 to 35 milliseconds after the commutator is started to drop out the advance clutch as is later described.

Figure 25A:
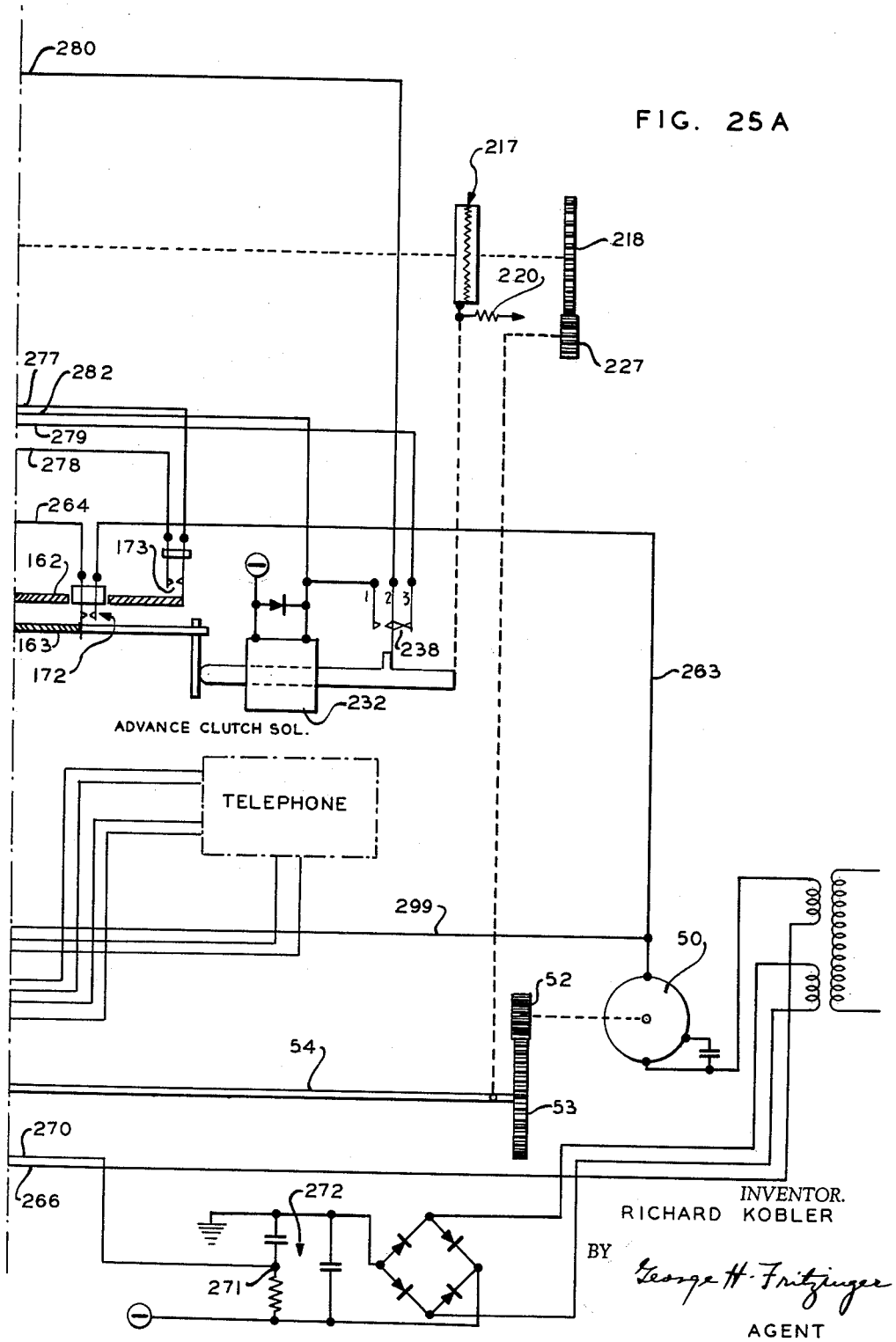

A functional description of the machine operating first as a recorder is herein next described primarily with reference to the schematic circuit diagram of FIGURES 25 and 25a. Prior to initiating recording the scan knob is shifted to the desired "in-track" position by aligning the pointer 31 with the subscriber's name and telephone number written on the subscriber's list sheet. When the scan knob is in the "in-track" position the motor track safety switch 93 is closed. The magnetic drum will stand initially in home position under influence of the spring 44 and the drive clutch 58 will be held engaged by the spring 65. The timing arm of the advance clutch switch will stand also in home position under influence of the spring 200 and the A.C. home lock switch will be held open. The advance clutch 217 will be held engaged by spring 220.

When the user shifts the record button 33 to the right momentarily to unlatch the lid 22 and cause the same to be propelled rearwardly into its open position by the spring 141 the motor reset safety switch 156 is first opened and next in the initial opening movement of the lid 22 the motor reset switch 262 is opened, this being a switch mounted in the forepart of the machine and engaged by the lid 22 so that it is held closed when the lid is latched closed. Upon releasing the record button after the lid has snapped open the motor reset safety switch 156 is closed but without effect because it is in series with the now open motor reset switch 262. When the lid 22 reaches its fully open position it latches the dial bar 32 in its raised position by the finger 158 of the lid underlying the arm 157a of the dial bar. Also, as the lid moves into its fully open position, it strikes the rocker 124 and operates the record switch 131 into its record position. This closes contacts 1–2 of the record switch without immediate effect because the motor reset switch 262 is now open but the closure of these contacts prepares a motor-run circuit via lead 263, dial motor switch 172, lead 264, contacts 2–1 of record switch 131, lead 265, motor track safety switch 98 and lead 266. Contacts 4–5 of the record switch are now open to disconnect the head 75 from the input of the playback amplifier 267, and contacts 5–6 of the record switch are closed to connect the head 75 via the lead 268, contacts 2–3 of the dial solenoid switch 269 controlled by the dial solenoid 242, and lead 270 to a D.C. erase terminal 271 of the power supply 272. Furthermore, contacts 7–8 of the record switch are opened to disconnect the terminal 1 of the dial relay 267a as well as the advance clutch playback reset terminal 258 from ground 273 to which they would otherwise be connected through contacts 7–8 of the record switch, lead 274, contacts 4–5 of the solenoid reset switch 110, lead 275 and contacts 2–1 of the drum mute switch 111.

Having operated the record switch 131 by the rocker 124 the latter is in a position to be latched by the drum operable latch 119.

Immediately after the lid 22 is unlatched it does not matter whether the user continues to hold the record button operated or not because, as will appear, motor operation is next started through a circuit running via contacts 1–2 of the record switch and the dial motor switch 172. However, when the lid 22 is closed the record button 33 must be released not only to effect the mechanical latching of the lid but also to complete the reset erase circuit through the motor reset safety switch 156, as will appear.

As soon as the lid 22 is unlatched into its open position the machine is in a record-standby condition—a non-operating condition ready for recording whenever a dial key is depressed. The scan knob 28 can however still be shifted to choose any desired track on the record. Further, after unlatching the lid 22 to shift the machine into its record-standby condition the user is free to return the lid to its latched position to restore the machine to a playback-standby condition so long as no dial key has been depressed. This is because the record switch 131 is not latched unless and until the magnetic drum is driven from home position responsive to pressing one of the dial keys.

Although the scan knob can be shifted after the machine is in its record-standby condition, it is required that the scan knob be "in-track" to close the motor track safety switch 98 before the machine can be started responsive to pressing a dial key. However, the motor track safety switch 98 will be closed even if the head 75 is slightly off track so that the motor will still then start responsive to pressing a dial key, but the initial running of the magnetic drum when a dial key is pressed while the head 75 is slightly off track, the curved outer edge of the slot 91 in the disc 90 (FIGURE 11) will cam the pin 89 outwardly and in turn the detent bar will be pressed against roller 86 (FIGURE 12) to cam it into full engagement with respective notch 82 in the detent bar and thereby cause the head 75 to be shifted precisely into an "in-track" position. If the head is in a mid position between two successive tracks when the dial key is depressed, the dial key will still be latched but the machine will not run until the head is next shifted into an "in-track" position.

If a dial key is depressed partially and released without being latched the dial motor switch 172 remains in its open position and the machine is not started. Furthermore, if a dial key is depressed all the way down and held there the motor still is not started because the dial motor switch 172 is not closed until the dial key is released into its latched position, as before described. Closure of the dial solenoid control switch 173 during the initial depression of a dial key is without effect because the motor is then not running. However, having pressed a key fully down the user is committed to recording the digit represented by that key because as the key is released to its latched position, the detent slide plate 163 is shifted relative to the inhibition slide plate 162 to close the dial motor switch 172 and start the motor running. By this mode of control, a recording operation is made independent of the manner of manipulation of the dial key, the same as when dialing a digit by a rotary dial the impulses are independent of the manual operation of the rotary dial because the pulses are not created until the dial is released.

The release of a depressed dial key into its latched position starts the motor over dial motor switch 172, contacts 1–2 of the record switch 131 and the motor track safety switch 98. The motor starts driving both the record drum through the clutch 58 and the timer arm 196 through the advance clutch 217. The machine starts in erase condition because erase current is now fed to the head 75 from the terminal 271 through lead 270, contacts 3–2 of the dial solenoid switch 269, lead 268, contacts 6–5 of record switch 131, head 75 and ground 276. Such erasure continues for 490 milliseconds, the time required to advance the timer arm 196 into contact with the slip-rings 240–241. Within this 490 millisecond erase interval the control lever 113 rides off of the finger 117a and shifts the record switch latch 119 into its operative position, locking the record switch in record position. As will appear this means that a reset operation will subsequently be required in order to return the magnetic drum to home position and the machine to its playback-reset condition.

If a dial key is pressed and released into its latched position, the dial solenoid control switch 173 will be closed to prepare the circuit for activation of the dial solenoid 242 when the brush B2 reaches the slip-rings 240–241, this circuit having been prepared by placing ground on the slip-ring 240 through lead 277, dial solenoid control switch 173, lead 278, contacts 3–2 of "out" switch 194, lead 279, contacts 3–2 of advance clutch solenoid switch 233, lead 280 and home lock switch 208 of timer arm 196 to ground 281. Also, the closure of the advance clutch home lock switch 208 as the timer arm 196 leaves home and the closure of the dial timer switch of the dial key which has been depressed prepare a snap-back circuit through the advance clutch solenoid 232 for the timer arm 196 when it reaches the respective now-activated digit terminal 181a–190a of the timer switch. For example, if dial key 1 is depressed into latched position this prepared snap-back circuit runs through advance clutch solenoid 232, leads 282 and 283, commutator switch 247—which is closed shortly after the timer arm reaches the digit terminal 181a as described in the next paragraph—lead 237, slip-ring 239, digit terminal 181a via brush 1, lead 288, dial timer switch 1, leads 193 and 279, contacts 3–2 of advance clutch solenoid switch 233, lead 280, and advance clutch home lock switch 208 to ground 281. Thus, upon closure of the commutator switch 247 after the timer arm reaches the digit terminal 181a responsive to pressing the dial key 1 the advance clutch 217 is disengaged and the timer arm is snapped back home by the spring 200. The fact that the advance clutch solenoid is controlled by the home lock switch 208 assures that the advance clutch 217 is held disengaged until return of the timer arm 196 fully to home position.

The circuit by which the dial solenoid 242 is activated when the timer arm reaches the slip-rings 240–241 runs via lead 289, slip-rings 241–240, lead 277, dial solenoid control switch 173, lead 278, contacts 3–2 of "out" switch 194, lead 279, contacts 3–2 of advance clutch solenoid switch 238, lead 280 and advance clutch home lock switch 208 to ground 281. Activation of the dial solenoid 242 unlatches the dog 243 to start driving the washout commutator switches 245–247 through the band clutch 248, the commutator switches being referred to as the washout switches because they are utilized to recreate the dial pulses during playback without error notwithstanding substantial tolerance variations in the recording of the time bands responsive to pressing the respective dial keys. Operation of the dial solenoid 242 also opens switch 269, contacts 2 and 3, to disconnect the head 75 from D.C. erase terminal 271 and to close contacts 1–2 to connect the head 75 instead to the record oscillator 290. By this reconnection of the head the machine is shifted from erase to recording of a time band. Closure of the contacts 4–5 of the dial solenoid switch 269 closes a muting circuit of the telephone receiver so that the user does not hear dial clicks in the receiver during the recording operation.

Although the timer arm 196 closes the first digit terminal 181a with the slip-ring 239 the instant the timer arm also closes the slip-rings 240–241 on each other to start the recording of a time band, operation of the advance clutch solenoid is delayed from 20 to 35 milliseconds by the washout commutator switch 247 since the circuit for the advance clutch solenoid runs via the commutator switch 247, slip-ring 239 and digit terminal 181a, dial timer switch 1, advance clutch solenoid contacts 3–2 and home lock switch 208. By this delay in the operation of the advance clutch solenoid the length of time band recorded when the dial key 1 is depressed is held to from 20 to 35 milliseconds. Actually the washout commutator switch 247 is set preferably to a delay of 20 milliseconds but with actuating time of the advance clutch solenoid, drop out time of the dial solenoid 242 and opening of contacts 1–2 of the dial solenoid switch 269, the resultant delay in the operation of the advance clutch solenoid is of the order of 35 milliseconds. Operation of the advance clutch solenoid approximately 35 milliseconds after the start of recording of the time band accomplishes the following functions: (1) it disengages the advance clutch 217 to start snap-back of the timer arm 196 to home position and to open the home lock switch 208 when the timer reaches home position, (2) it operates the advance clutch solenoid switch 238 opening contacts 2–3 to drop out the dial solenoid even before the timer arm 196 breaks contact with the slip-rings 240–241 in its return stroke and closes contacts 1–2 of switch 238 to shift the energizing circuit of the advance clutch directly through the home lock switch 208 to hold the advance clutch solenoid positively operated until the timer arm 196 reaches home, and (3) it operates the detent slide 163 to unlatch the dial key last operated, thereby opening the dial motor switch 172 and shutting off power to the motor. When the dial key snaps up to unoperated position it opens the dial solenoid control switch 173 but without effect because the prior opening of the advance clutch solenoid switch 238 at contacts 2 and 3 has already withdrawn ground from the circuit. Likewise, the opening of the dial timer switch 1 as the dial key snaps up is without effect for the same reason. Also, the opening of the dial motor switch 172 has no effect because the motor coasts after the motor circuit is opened to bring the washout commutator 244 to home position. The opening of the advance clutch home lock switch 208 as the timer arm 196 reaches home drops out the advance clutch solenoid and restores engagement of the advance clutch 217. In the foregoing sequence, as the dial solenoid 242 drops out its plunger is returned into the path of the clutch dog 243 to stop the washout commutator 244 at the end of the revolution then under way. Although the motor circuit is opened at practically the same time, the motor coasts after current cutoff to complete the revolution of the washout commutator 244 and then the one-way band clutch 248 opens. During this continued coasting of the motor after motor circuit cut-off—which is at least for approximately 65 milliseconds—an erase band is provided on the record following the time band recording because the dial solenoid switch contacts have again connected the head to the D.C. erase terminal. When the motor stops after recording a time band responsive to pressing a dial key the record drum remains in its advanced position because of the drive clutch 58 remaining engaged.

If a higher digit dial key than the key 1 is depressed the operation is the same as before described except that the motor continues running until the timer arm 196 reaches the digit terminal 181a–191a corresponding to the higher dial key. During the continued running of the motor the washout commutator continues to run one additional revolution for each higher digit than digit 1 being recorded. In so driving the timer arm 196 past the first digit terminal 181a and continuing rotation of the washout commutator at a rate of one revolution every 100 milliseconds the time band recording is increased by 100 milliseconds for each digit higher than one. For example, if dial key 4 is depressed there is first provided 490 milliseconds' erase time followed by 300 milliseconds' record time as timer arm 196 scans terminals 181a, 182a and 183a, plus 35 milliseconds' record time after timer arm rides onto terminal 184a, making total time band recording of 335 milliseconds, followed then by approximately 65 milliseconds' erase time; if dial key 7 is depressed there is produced again 490 milliseconds' erase time followed by 635 milliseconds' time band recording followed by 65 milliseconds' erase time, and so forth. Thus, successive time bands are always separated by approximately 555 milliseconds' interdigital erase time and the length of time bands are 35 milliseconds plus 100 milliseconds for each digit higher than 1 being recorded.

The switch 245 of the washout commutator is a pulsing switch connected directly to the telephone. This switch is open for approximately 60 milliseconds and closed for the remaining 40 milliseconds of each revolution of the commutator. If during the recording the user had the receiver off the hook this pulsing switch will produce one pulse as the dial key 1 is depressed, two pulses when dial key 2 is depressed, etc., the same as in the usual telephone dialing operation. Thus by taking the receiver off during recording the user can dial out the telephone number by the dial key as the telephone number is being recorded.

Although the dial solenoid switch 269 has a pair of telephone muting contacts 4–5 connected to the telephone to mute the dial pulses fed into the telephone so that the user does not hear the dial clicks in his receiver when a telephone number is being recorded, this mute switch is ineffective during the last pulse because the dial solenoid drops out about 65 milliseconds before the last revolution of the washout commutator is completed. To provide complete muting even of the last pulse the washout commutator is provided with a muting switch 246 connected also to the telephone and which remains closed during nearly each full revolution of the washout commutator. The telephone receiver is always unmuted during standby of the machine and immediately after a record dialing or playback operation because the dial solenoid is then not operated and the washout commutator is at standstill. This enables outside dial tone to be heard in the receiver after the "out" dial key is pressed. The dial pulsing switch 286 is closed when the washout commutator reaches home to assure continuity of the telephone line during standby.

As before described, about 490 milliseconds of an overall interdigital erase time of 555 milliseconds is obtained ahead of each time band recording and the remainder following the time band recording responsive to each dial key operation. Since considerably more tolerance in length of interdigital erase bands than in time bands is permitted, and the timer arm 196 is returned during formation of interdigital erase time, the rate of snap-back of this arm is not critical. Also, since the motor is starting up during formation of the first 490 milliseconds of interdigital erase time, a relatively slow start-up of the motor is permitted. Still further, since 65 milliseconds of erase time is provided after the motor circuit cut-off is completed a relatively high coasting motor is permitted. These permissible drive features permit the use of an economical standard type of drive motor. Even if coasting time of the motor exceeds 65 milliseconds, causing the timer arm to be driven from home and the home lock switch 208 to be reclosed before the motor stops coasting, no harm is done because the advance clutch solenoid and dial solenoid have already dropped out. The only possible drawback would be that so much of the 490 millisecond portion of the interdigital erase time might be used up as the motor coasts to standstill after recording one digit, that not enough of the 490 millisecond interval remains to permit the motor to come up to full speed before start of the time band recording begins responsive to pressing a second dial key to record a second digit.

If only 1,490 milliseconds additional erase time is desired when the "out" dial key is depressed, the terminal 191a would be connected to the A.C. solenoid 232 through a jumper not shown to the lead 282. Operation of the "out" key has the same operation as when a digit dial key is depressed except that the opening of contacts 2-3 of the switch 194 keeps the dial solenoid 242 from now operating and produces therefore only erase time. For example, as the "out" key is depressed the dial motor switch is closed to start the motor, starting rotation of the timer arm 196 and driving the magnetic drum 30. When in 1,490 milliseconds this arm reaches terminal 191a the advance clutch solenoid 232 would be operated to release the "out" key and to return the timer arm to home position throguh leads 282 and 291, terminal 191a, ring 239, contacts 1-2 of the access switch 194, contacts 3-2 of the advance clutch solenoid switch 238, lead 280 and switch 208 to ground 281. Operation of the advance clutch solenoid would change the circuit directly to ground 281 over contacts 1-2 of the advance clutch solenoid switch 238 and disengage the advance clutch 217 causing snap-back of the timer arm 196 and opening of home lock switch 208 to deactivate the advance clutch solenoid when the timer arm reaches home. Since during the running of the motor the head 75 was connected to the erase terminal 271 over contacts 3-2 of the dial solenoid switch 269, an erase band of 1490 milliseconds' duration would be provided on the record responsive to pressing the "out" key. When the next digit dial key is depressed there would first be added the usual 490 milliseconds in erase time before the next digit time band, which together with the 65 milliseconds' erase time added at the end of the prior digit recording would produce a total waiting time for outside dial tone of approximately 2045 milliseconds.

If a greater waiting time of 2690 milliseconds is desired for outside dial tone instead of 1490 milliseconds then the terminal 261 is connected by jumper 291 to the lead wire 282 instead of the terminal 191a. The operation is then such that 2690 milliseconds instead of 1490 milliseconds is added to the interdigital time between the two successive digit recordings, making the total 3245 milliseconds.

If the terminal 191a were connected in circuit then the playback reset terminal set at 2300 milliseconds from home and record reset terminal 257 set at 2550 milliseconds from home would be connected in circuit; however, when the terminal 261 is connected in circuit as shown in FIGURE 2 the playback reset terminal 258 set at 3520 milliseconds from home and the record reset terminal 259 set at 3770 milliseconds from home are connected in circuit as shown in FIGURE 25. This will be more fully apparent from the following description of the reset and playback operations of the machine.

If two or more digit dial keys are depressed simultaneously all will become latched but the machine will record the lowest digit of the keys depressed, and then all of the keys so latched will be released to their unoperated positions. On the other hand, if a digit key and the "out" key are depressed simultaneously the "out" key is controlling because it disables the dial solenoid 242 and causes the machine to produce an erase band of 1490 milliseconds or 2690 milliseconds, depending upon whether the terminal 191a or the terminal 261 is connected to the advance clutch solenoid.

If the head 75 is midway between two tracks when a dial key is depressed, the motor will not start because the motor track safety switch 98 is then open. The user may then start the machine by shifting the scan knob to bring the head "intrack." If the user should next close the dial lid the machine will be restored to playback-standby condition.

If the user presses a dial key when the head is between tracks, closes the lid 22 and shifts the head to an "intrack" position, the motor is started via the motor track safety switch 98, contacts 1-2 of the record switch (which is still held latched), motor reset switch 262, motor reset safety switch 156 and lead 299. However, the prior closing of the lid 22 has returned the machine to playback-standby condition, with the result that one false digit train will be sent out because of the previous depressed dial key but without this train being recorded.

*Reset*

After operation of at least one dial key the machine can be restored to playback-standby condition only by a reset operation initiated by closing the dial lid 22. As will appear, the reset operation will be carried out when the lid is closed whether or not all of the dial keys are released at the time. Upon closing the lid 22 the record switch 131 remains latched momentarily in record position but the latch is removed from the dial bar 32. This removal is without immediate effect because the dial bar 32 would not now normally have been pressed and even if it should have been pressed accidentally no harm would have been done because the motor is running and the closing of the playback switch contacts 4-5 responsive to the closing of the dial bar would be without effect inasmuch as ground has been removed from the dial relay switch 267a by the opening of contacts 7-8 of the record switch 131. As the lid 22 becomes latched the motor reset safety switch 156 is first opened, the motor reset switch 262 is next closed and then the motor reset safety switch 156 is closed, making an actual latching of the lid the determining factor whether or not the motor is started. This will be apparent from the fact the motor start circuit runs through lead 299, motor reset safety switch 156, motor reset switch 262, lead 264, contacts 2-1 of record switch 131, lead 265, motor track safety switch 98 and lead 266. If no dial key is latched when the lid is closed the dial solenoid control switch 173 is open and the dial solenoid 242 is not operated. The machine is therefore in erase-run condition. As the motor runs responsive to closing the lid 22 the timer arm 196 is advanced until it reaches the reset terminal 259 at 3770 milliseconds from home. During this reset run of the machine the drum 30 is advanced to provide a 3770 millisecond erase time band following the last recorded digit. Upon the timer arm 196 reaching the reset terminal the reset solenoid 69 is operated by leads 300 and 301, slip-ring 260, terminal 259, lead 302, contacts 4–5 of reset switch 110, lead 275 and contacts 2–1 of drum mute switch 111 to ground at 273. The first operation performed by the reset solenoid is to turn the rocker 113 via link 105 and release the record latch 119 to permit instantaneous return of the record switch 131 to playback position. Return of this record switch opens contacts 1–2 to stop the drive motor and opens contact 5–6 to disconnect the head 75 from the D.C. erase terminal 271, closes contact 4–5 to connect the head to the playback amplifier 267 and closes contacts 7–8 without immediate effect. Another operation of the reset solenoid is to operate the reset switch 110 closing contacts 1–2 before opening contacts 4–5 to maintain the reset solenoid 69 operated over the drum home lock switch 49 to ground 276 until the drum is returned home. Operation of the reset switch also closes contacts 5–6 operating the advance clutch solenoid 232 via drum end switch contacts 1–2 and ground 273. Operation of the advance clutch solenoid 232 disengages the advance clutch 217 and starts snap-back of the timer arm 196 to home position. Also the advance clutch solenoid 232 operates the advance clutch solenoid switch 238 closing contacts 1–2 before opening contacts 2–3 to maintain the advance clutch solenoid operated over the A.C. home lock switch 208 until the timer arm 196 reaches home. A further operation of the reset solenoid 69, is to disengage the drum clutch 58 to start snap-back of the drum 30 to its home position but this operation is delayed relative to the switch operations abovedescribed because of the lost-motion couplings 64–67 between the reset solenoid and the drum clutch. Since the record switch 131 will already have been returned to playback position when the drum snap-back begins no erasure of the record is produced during the drum snap-back. As the drum reaches home position it opens the home lock switch 1–2 dropping out the reset solenoid and reengaging the drum clutch. However, just prior to the dropout of the reset solenoid the finger 117a will have moved underneath the arm 113a of the control lever 113 to lock the control lever in its clockwise position and therefore assure that the record switch will remain in its playback position when the drum has reached home.

Operation of the reset solenoid also releases the playback latch 95–104 but without effect because the dial bar 32 is normally not latched down during reset, but even if it had been accidentally pressed during reset it would now be unlatched without producing any effect on the machine.

If the reset operation is started while a dial key is still latched down, the recording of the digit is completed followed by snap-back of the timer arm 196 and the dial key to its unoperated position. Thereupon there proceeds the reset-erase-run operation without interruption because the motor is kept running over contacts 1–2 of the record switch 131, motor reset switch 262 and motor reset safety switch 156.

Playback

A playback operation is carried out by first shifting the scan knob to the desired subscriber's name on the subscribers list sheet, making sure that the head 75 is placed in an "in-track" position which can be determined by the feel of the scan knob, and then pressing the dial bar until the same is latched down by the finger 95b engaging the catch 104. Although the shifting of the scan knob prior to pressing the dial bar causes transients to be picked up by the transverse movement of the head across the successive record tracks, such transients are prevented from intermittently operating the advance clutch solenoid 232 and dial solenoid 242 because their circuits are now held open by the contacts 1–2 of the drum mute switch 111. The depressing of the dial bar will also latch the record button in its unoperated position by the arm 154 of the lid latch catching on the bail 99 as shown in FIGURE 6. As the dial bar 32 is depressed the motor track safety switch 98 is first opened by the camming action of the catch 104 on the finger 95b and thereupon contacts 1–2 of playback switch 159 are closed and contacts 4–5 of this switch are closed in sequence to connect the dial solenoid 242 to the terminal 2 of the dial relay 267a. Note that the advance clutch solenoid 232 is already directly connected to this terminal 2 of the dial relay via lead 282. Accordingly, both the dial solenoid and the advance clutch solenoid are under control of the dial relay 267a. At the end of press down of the dial bar 32, the motor track safety switch 98 is reclosed to start the motor advancing the drum 30. During the first 490 milliseconds of drum rotation no playback takes place because the head is scanning an erase time band during this interval; also, during this first interval contacts 1–2 of the drum mute switch 111 are open to keep ground connection from the dial solenoid and the advance clutch solenoid whereby to prevent their possible operation during this first interval should the dial relay 267a be operated by transients. After about 300 milliseconds of drum rotation from home position the rocker 113 snaps off from the finger 117a actuating the latch 119 but without effect because the record switch 131 remains biased in its playback position. Before completion of the 490 millisecond initial run of the drum from home position contacts 1–2 of the drum mute switch 111 are closed to place both the dial solenoid and the advance clutch solenoid under control of the dial relay 267a. Furthermore, before completion of the 490 millisecond run of the drum the notch 91 in the drum disc 90 will have moved out of registration with pin 89 (FIGURE 11) to apply the scan lock and prevent any further possible shifting of the scan knob during the ensuing playback operation.

During the playback of a time band the dial relay 267a is held operated, closing the contacts thereof to activate the advance clutch 232 and the dial solenoid 242 over contacts 7–8 of the record switch 131, contacts 4–5 of the reset switch 110 and contacts 1–2 of the drum mute switch 111. Operation of the dial solenoid 242 starts running the washout commutator 244 to feed out one dial pulse from switch 245 thereof during each revolution and to close the record mute switch 246 to prevent the user from hearing the dial pulses in the receiver. Closure of the contacts 1–2 of the dial solenoid switch 269 have no effect because the record oscillator 290 is grounded over contacts 10–11 of the record switch 131. Closure of contacts 4–5 of the dial solenoid switch serve merely to suppress the dial clicks in the receiver during playback. Operation of the advance clutch solenoid opens the advance clutch 217 causing the timer arm 196 to snap back to home position. Operation of the advance clutch solenoid also opens contacts 2–3 of the advance clutch solenoid switch 238 but without immediate effect because the advance clutch solenoid 232 is now activated over the contacts 1–2 of the drum mute switch 111. However, the closing of contacts 1–2 of the advance clutch solenoid switch 238 provides a direct circuit for the advance clutch solenoid over the A.C. home lock switch 208. Speed of snap-back of the timer arm 196 is not important so long as it returns in less than 250 milliseconds—the difference between the positioning of the record reset and playback reset terminals 256 and 257 or 258 and 259 of the timer switch.

At the end of playback of a time band representing a particular digit there is some small delay in the amplifier circuit before the dial relay 267a drops out. The dropout however is no more than 80 milliseconds after start of playback of the time band for digit 1, 180 milliseconds for digit 2, 280 milliseconds for digit 3, etc. Drop out of the dial relay 267a produces also concurrent dropout of the dial solenoid 242 and of the advance clutch solenoid 232. Drop out of dial solenoid 242 returns arm 242a in blocking relationship with the dog 243 and stops rotation of the washout commutator 244 at the completion of the revolution then underway. Return of the advance clutch solenoid re-engages the advance clutch 217 and immediately starts readvance of the timer arm 196. The only terminal of the timer switch now active in the circuit is terminal 258 set at 3520 milliseconds, or alternatively terminal 256 set at 2300 milliseconds, depending upon whether the terminal 261 or the terminal 191a is connected in the circuit. Thus, during the scanning by the playback head of each interdigital space the timer switch is being advanced. However, since the normal interdigital spaces are each approximately 550 milliseconds and an "out dialing" interdigital space is no more than 2045 milliseconds the timer arm will come far short of reaching the active terminal 258 when pick-up of the next time band begins. As before, when pick-up of the next time band begins the dial solenoid 242 and the advance clutch solenoid 232 will again be activated to start another train of pulses and to cause snap-back of the timer arm 196 to home position. However, after reproducing the last recorded digit of a telephone number the playback head begins scanning the reset erase time band of 3770 milliseconds, which is a good 250 milliseconds longer than the time required for the timer arm to reach the active playback reset terminal 258. When the timer arm reaches this active terminal 258, the reset solenoid 69 is activated via leads 300 and 301, slip-ring 260, terminal 258, lead 303, contacts 7–8 of record switch 131, lead 274, contacts 4–5 of reset switch 110, lead 275 and contacts 2–1 of drum mute switch 111 to ground 273. Operation of the reset solenoid turns the control lever 95 unlatching the dial bar and removing the latch from the record button, and opens the drum clutch to cause the drum to be snapped back to home position and to remove the lock on the scan knob as the drum reaches home.

If for any reason the drum runs through a full revolution the drum end switch 111 makes through its 1–2–3 contacts to provide ground to the reset solenoid 69, causing the reset solenoid to be operated the same as in record—or playback—reset. In this case snap back of the drum is started without any prior reset erase band being provided on the record drum.

I claim:

1. In an automatic telephone repertory dialing system: the combination of a dial mechanism comprising a group of dial keys selectively depressible according to letters and digits of telephone numbers to be dialed, means responsive to releasing a dial key from a fully depressed position for partially returning the key and latching the same in an intermediate position, a record medium, means for recording signals on said record medium representative of a digit dialed, and means controlled by said dial keys respectively for starting said recording means only upon release of a dial key into a latched intermediate position.

2. In an automatic telephone repertory dialing system: the combination of a dial mechanism selectively operable according to letters and digits of telephone numbers to be dialed, a timing mechanism responsive to each manual operation of said dial mechanism to run for a fixed time interval plus a variable time interval dependent on the dial key depressed, a record medium, and means controlled by said timing mechanism for producing a non-recorded track on said record medium of a length dependent on said fixed time interval and for producing a recorded digit-representing signal on the record medium during said variable time interval.

3. In an automatic telephone repertory dialing system: the combination of a set of manually operable dial keys, a magnetic record medium, a record-reproduce machine including means shiftable to place the machine into record-standby and reproduce-standby conditions, means responsive to each selective operation of said dial key set when said machine is in record-standby condition for starting the machine to record a magnetic pattern on said medium representative of the digit dialed and then stopping the machine, manual means for starting said machine when the same is in reproduce-standby condition for converting the magnetic patterns representing a recorded telephone number into corresponding dialing signals, a cover for said dial key set shiftable between open and closed positions, and means controlled by said cover as the cover reaches open position for shifting said machine into record-standby condition and controlled by said cover as the same reaches closed position for shifting the machine into reproduce-standby condition.

4. The combination set forth in claim 3 including means controlled by said cover for latching said manual starting means when said cover is open, means biasing said cover into open position, means responsive to closing said cover for latching the same in closed position, and means responsive to movement of said latching means into operative position after said cover is closed for returning the machine to a start position on said record medium with the machine in reproduce-standby condition.

5. The combination set forth in claim 3 wherein said machine includes a transducer in cooperative relation with said record medium and drive means responsive to each operation of said dial keys for producing a relative advance movement between the record medium and transducer from home position, and means responsive to closing said cover after a selective operation of said dial key set for returning said transducer and record medium to their home positional relationship.

6. The combination set forth in claim 3 including means for latching said machine in record-standby condition responsive to a selective operation of said dial key set, and means responsive to closing said cover for releasing said latching means.

7. In an automatic telephone repertory dialing system: the combination of a manually operable dial, a record-reproduce machine including means shiftable to place the machine into record-standby condition and reproduce-standby condition, a record medium, a transducer and drive means for producing a relative advance movement between said medium and transducer from a home position, means for starting said machine in record condition responsive to an operation of said dial, other starting means for starting said machine when the same is in reproduce condition, means responsive to a relative advance movement between said medium and transducer from home position for latching said conditioning means, means responsive to a selective operation of said dial when said machine is in record-standby condition for first providing a non-recording advance through a predetermined distance between said medium and transducer followed by a recording advance through a distance dependent on the digit dialed, and means operative during said non-recording advance for operating said latching means.

8. The combination set forth in claim 7 including a manual scanning means for shifting said transducer by increments relative to said record medium into registration with successive tracks on the record medium, and means responsive to a relative movement between said record medium and transducer through said predetermined non-recorded distance for latching said manual scanning means.

9. In an automatic telephone repertory dialing system: the combination of a manually operable dial, a record-reproduce machine including means shiftable to place the machine selectively into record-standby condition and reproduce-standby condition, a record medium, a transducer and drive means for producing a relative advance movement between said medium and transducer from a home position, manual means for starting said machine in reproduce condition from said home position, means responsive to a selective operation of said dial when said machine is in record-standby condition for first providing a no-signal recording advance between said record medium and transducer through a predetermined distance followed by a digit-signal recording advance through a distance from said home position dependent upon the digit dialed, and means responsive to operation of said manual starting means for rendering said reproducing means unresponsive to any signals picked up by said transducer during advance of the transducer from home position through a major fraction of said predetermined distance.

10. In an automatic telephone repertory dialing system: the combination of a dial mechanism comprising a group of dial keys selectively depressible according to letters and digits of telephone numbers to be dialed, a timing mechanism responsive to operation of said dial mechanism to run a preselected interval depending upon the digit dialed, a record medium, means responsive to each operation of said dial mechanism and controlled by said timing mechanism for recording digit-representing signals on said record medium for a duration depending upon the digit dialed, wherein said timing mechanism comprises a rotary switch arm biased to a home position, means including a normally engaged clutch for driving said switch arm at a fixed speed from home position during operation of said recording means, spaced digit-representing terminals in the path of said switch arm, circuit means controlled by said dial for selectively activating said terminals, and means responsive to said switch arm making contact with said preselected terminal for stopping the recording means and disengaging said clutch.

11. The combination set forth in claim 10 wherein said last stated means comprises timing means activated by said switch arm making contact with said preselected terminal for stopping said recording means and disengaging said clutch upon elapse of a predetermined time interval after said contact is made.

12. In an automatic telephone repertory dialing system: the combination of a dial mechanism comprising a group of dial keys selectively depressible according to letters and digits of telephone numbers to be dialed, a timing mechanism responsive to operation of said dial mechanism to run a preselected interval depending upon the digit dialed, a record medium, means responsive to each operation of said dial mechanism and controlled by said timing mechanism for recording digit-representing signals on said record medium for a duration depending upon the digit dialed, wherein said timing mechanism comprises a rotary switch arm biased to home position and spaced digit-representing terminals in the path of said switch arm, means including a normally engaged clutch for driving said switch arm at a fixed speed from home position during operation of said recording means, a homing switch operably closed by said switch arm as the same is move from home position, a solenoid for disengaging said clutch to permit snapback of said switch arm, circuit means controlled by said dial for selectively activating said terminals, and means responsive to said switch arm reaching said selected terminal for activating said solenoid via homing switch to cause said clutch to be held disengaged until said switch arm is returned home.

13. The combination set forth in claim 12 wherein the first of said digit terminals is at an approximate 500 millisecond interval from home position of the switch arm and successive digit terminals are at 100 millisecond intervals in terms of the speed of driven movement of the switch arm.

14. The combination set forth in claim 13 including circuit means controlled by said timing switch for providing an erased track on said record medium during the movement of the switch arm from home position to the first of the digit terminals, means controlled by said timing switch for starting the recordation of digit-representing signals when said switch arm reaches the first of said digit terminals, and means included in said stopping means and controlled by said timing switch when said switch arm makes contact with said preselected digit terminal for stopping said recording means within a predetermined time interval less than 100 milliseconds after said switch arm reaches said preselected terminal.

15. The combination set forth in claim 14 including a rotary dialing switch, means for driving said dialing switch at a rate of ten revolutions per second, and a one-revolution clutch between said dialing switch and drive means controlled by said timing switch for engaging said clutch when said rotary switch arm makes contact with the first of said digit terminals and for disengaging said clutch upon completion of the revolution of the dialing switch then underway when said rotary switch arm makes contact with said preselected digit terminal.

16. In an automatic repertory telephone dialing system: the combination of a dial mechanism selectively operable according to letters and digits of telephone numbers; a timing switch comprising a rotary switch arm biased to home position, electric motor-operated means and drive clutch for driving said switch arm at a uniform speed from home position, and a series of digit-representing terminals spaced from the home position of said switch arm and individually spaced at 100 millisecond intervals from each other in terms of the speed of said switch arm; a record medium; a transducer normally connected to a source of erase current; means for relatively moving said transducer and record medium by said drive means; means for activating said digit-representing terminals selectively by said dial mechanism and for concurrently starting said drive means; a rotary timing switch and means for driving the same at a speed of one revolution per 100 milliseconds, said driving means including a one-revolution integrating clutch; means for engaging said integrating clutch and for feeding a digit-representing signal to said transducer when said switch arm reaches the first of said digit terminals; and means controlled by said rotary timing switch when the same has turned a minor fraction of one revolution after said switch arm has reached said activated digit-representing terminal for restoring feed of erase current to said transducer, resetting said integration clutch to disengage at the end of the revolution of movement then underway, disengaging said advance clutch to permit snapback of said rotary switch arm to home position, and removing electric power from said motor-operated drive means to allow said recording means to coast to a stop while in an erase condition.

17. In an automatic telephone repertory dialing system: the combination of a manually operable dialing mechanism, a record medium, a transducer, means for shifting the transducer by increments relative to said medium into registration with successive tracks on said medium, detent means intermittently operated during shifting of said trandsucer to define the "in-track" positions thereof, a machine responsive to a selective operation of said dialing mechanism for recording on said medium signals representative of the digit dialed, means operable to start the machine running as a reproducer for converting said recorded signals into a dial pulse signal series, and condition preparatory means for said machine controlled by said detent means for rendering the machine operable only when said transducer is in a substantially "in-track" position.

18. The combination set forth in claim 17 including means operative by the initial running movement of said machine when the machine is started while said transducer is slightly off track for shifting the transducer into an "in-track" position.

19. The combination set forth in claim 18 wherein said record medium is in the form of a drum movable from home position to cause said transducer to scan the same, including means for shifting said transducer by increments into registration with successive tracks around said drum, and means operatively interposed between said drum and said detent means for locking said drum when said transducer is between successive tracks and for locking said shifting means when said drum is out of home position.

20. In an automatic telephone repertory dialing machine: the combination of a recording mechanism comprising a record medium and a recorder head shiftable along said record medium into registration with successive tracks for receiving recorded subscribers telephone numbers, a manual scan knob for shifting said head past respective tracks on the record medium, means for reproducing recorded telephone numbers of subscribers names selected by said scan knob including drive means for producing a relative movement between said head and record medium and a dial bar extending along the path of said scan knob and depressible to start said reproducing means, a latch for holding said dial bar operated, means for detenting said scan knob in successive positions corresponding to successive in-track positions of said head, and means controlled by said detent means when said head is midway between successive tracks for disabling said dial-bar latching means and for preventing starting of said drive means.

21. The combination set forth in claim 20 wherein said detenting means is operative to cam said head into an in-track position when the head is displaced slightly therefrom, means for rendering said starting means operative when said head is in said slightly displaced position, and means operable by initial relative movement between said head and record medium from home position for actuating said detenting means to cam said head into said in-track position.

22. In an automatic telephone repertory dialing machine: the combination of a housing having a top flat side, means for attaching a rectangularly-shaped subscribers list sheet on a lefthand portion of said upper side with subscribers names on successive lines in a row running from back to front, a recording mechanism comprising a record medium and a recorder head shiftable along said record medium into registration with successive tracks corresponding to successive lines on said list sheet, a manual scan knob movable along the right edge of said list sheet past said successive lines for shifting said head past respective tracks on the record medium, and a pointer at the left side of said list sheet carried with said scan knob for indicating the successive positions of registration of said head with said tracks.

23. The repertory dialing machine set forth in claim 22 including a trough in the upper side of said machine along the right edge of said subscribers list sheet, said scan knob being inset in said trough and movable therealong to select subscribers names to be dialed, means for reproducing the recorded telephone numbers of subscribers names selected by said scan knob, and a dial bar in said trough below said scan knob and extending along said trough, said dial bar being mounted to permit it to be depressed from any point along its length, and means responsive to depressing said dial bar for starting said reproducing means.

24. A dial mechanism for an automatic telephone repertory dialing machine, comprising a set of dial keys arranged side-by-side in successive rows, each of said dial keys having a frusto-pyramidal shape and being depressible into a latched-operated position, telephone dialing designations on said keys comprising digit designations on the top flat surfaces of the keys and letter group designations on the front sloping surfaces of certain of said keys, and means responsive to selectively operating said keys for producing dial signals representative of the digit and/or letter on the respective key.

25. In an automatic telephone repertory dialing system: the combination of a dial mechanism comprising a group of dial keys selectively depressible according to letters and digits of telephone numbers to be dialed, means for latching said keys respectively in operated position, a record medium, means responsive to pressing a selected key into a latched position for latching all remaining keys in unoperated position and for recording on said medium signals representative of the digit dialed, means responsive to completion of recordation of the signals representative of the digit dialed for releasing said selected key to unoperated position, stopping said recording means and unlatching all of said remaining keys, and means responsive to pressure against a latched unoperated key when said selected key is released for preventing full return of said selected key to unoperated position and for maintaining said remaining keys latched in unoperated positions until said pressure is released.

References Cited by the Examiner

UNITED STATES PATENTS

| | | | |
|---|---|---|---|
| 2,438,496 | 3/48 | Deakin | 179—90 |
| 2,558,187 | 6/51 | Marrison | 179—90 |
| 2,567,812 | 9/51 | Hickman | 179—90 |
| 2,581,218 | 1/52 | Thompson | 235—145 |
| 2,767,252 | 10/56 | Weimershaus | 179—90 |
| 2,892,897 | 6/59 | Vidal et al. | 179—90 |
| 2,945,918 | 7/60 | Steinbach | 179—90 |
| 2,953,647 | 9/60 | Johanson | 179—90 |
| 3,040,133 | 6/62 | Kobler et al. | 179—90 |

ROBERT H. ROSE, *Primary Examiner.*

L. MILLER ANDRUS, *Examiner.*